United States Patent

Kobayashi et al.

[11] Patent Number: 5,680,185
[45] Date of Patent: Oct. 21, 1997

[54] POLYMER DISPERSED LIQUID CRYSTAL (PDLC) DISPLAY APPARATUS

[75] Inventors: Hidekazu Kobayashi, Nagano-ken, Japan; Kiyohiro Samizu, State College, Pa.; Eiji Chino, Nagano-ken, Japan; Jin Jei Wu, Taipei, Taiwan

[73] Assignee: Seiko Epson Corporation, Tokyo-to, Japan

[21] Appl. No.: 228,044

[22] Filed: Apr. 15, 1994

Related U.S. Application Data

[63] Continuation-in-part of Ser. No. 798,478, Nov. 26, 1991, Pat. No. 5,305,126.

[30] Foreign Application Priority Data

| Nov. 26, 1990 | [JP] | Japan | 2-321779 |
| Feb. 12, 1991 | [JP] | Japan | 3-18750 |
| Feb. 20, 1991 | [JP] | Japan | 3-26024 |
| Feb. 20, 1991 | [JP] | Japan | 3-26025 |
| Mar. 22, 1991 | [JP] | Japan | 3-59126 |
| May 23, 1991 | [JP] | Japan | 3-118619 |
| Jun. 7, 1991 | [JP] | Japan | 3-136170 |
| Jun. 12, 1991 | [JP] | Japan | 3-140008 |
| Jun. 17, 1991 | [JP] | Japan | 3-144583 |
| Jun. 25, 1991 | [JP] | Japan | 3-153116 |
| Jul. 9, 1991 | [JP] | Japan | 3-167972 |
| Aug. 9, 1991 | [JP] | Japan | 3-200716 |
| Sep. 3, 1991 | [JP] | Japan | 3-222982 |
| Oct. 29, 1991 | [JP] | Japan | 3-282703 |

[51] Int. Cl.⁶ ................................ G02F 1/136
[52] U.S. Cl. ............................... 349/88; 349/94
[58] Field of Search ............... 359/40, 41, 51, 359/52, 68, 75, 96; 349/88, 94, 86

[56] References Cited

U.S. PATENT DOCUMENTS

| 4,890,097 | 12/1989 | Yamashita et al. | 349/48 |
| 4,994,204 | 2/1991 | Doane et al. | 359/94 |
| 5,087,387 | 2/1992 | Mullen et al. | 359/104 |
| 5,117,299 | 5/1992 | Kondo et al. | 349/48 |
| 5,142,389 | 8/1992 | Fergason | 349/86 |
| 5,240,636 | 8/1993 | Doane et al. | 349/86 |
| 5,251,048 | 10/1993 | Doan et al. | 359/51 |
| 5,264,953 | 11/1993 | Hirai et al. | 359/51 |
| 5,305,126 | 4/1994 | Kobayashi et al. | 359/52 |
| 5,327,271 | 7/1994 | Takeuchi et al. | 359/51 |
| 5,353,133 | 10/1994 | Bernkopf | 359/51 |

FOREIGN PATENT DOCUMENTS

64-59335  3/1989  Japan.

OTHER PUBLICATIONS

Bahadur "Liquid Crystals: Applications And Uses" vol. I, p. 362–362 and vol. III, pp. 190–193.

*Primary Examiner*—Huy Mai
*Attorney, Agent, or Firm*—Oliff & Berridge

[57] ABSTRACT

A polymer dispersed liquid crystal display apparatus has a liquid crystal/polymer medium formed between spatially disposed electrodes formed spatially disposed substrates. The medium includes a polymer phase and a liquid crystal phase having optical axes alignable together in a predetermined direction. A light absorption additive is included in the liquid crystal phase to provide light absorption when said optical axes are aligned in said predetermined direction so that in the presence or absence of an electric field applied between said electrodes, two different conditions are achieved comprising alignment and misalignment of the optical axes of the liquid crystal phase relative to the polymer phase so that in one condition, a light absorption state is created in the medium and in the other condition, a light scattering state is created in the medium. The polymer phase comprises a network including a plurality of continuous strings of particles connected in helicoid formation due to the addition of a chiral component, and this network may also include separate discrete polymer particles. Also a matrix network may be employed. A reflecting surface on the side of the liquid crystal/polymer medium opposite to that of incident light will enhance the light scattering and light absorbing properties in either of the two different conditions. Alternatively, the opposite side may be a white surface providing for a high contrast display with light absorption additive in the medium of dark contrast, such as, black dichroic dye.

86 Claims, 8 Drawing Sheets

FIG._1A
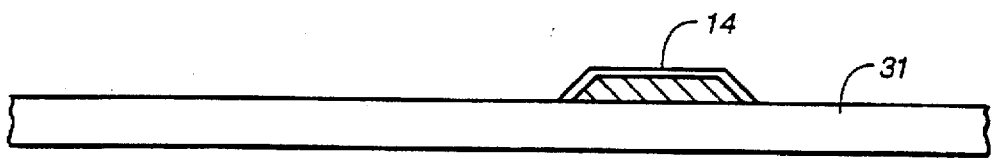
FIG._1B
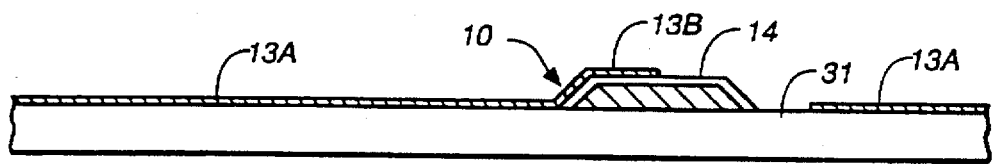
FIG._1C
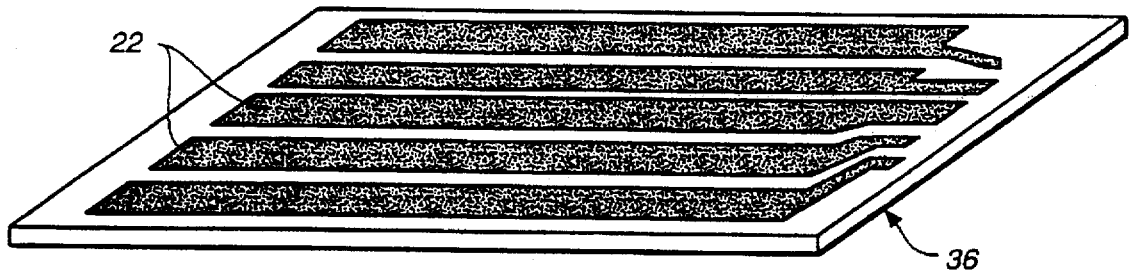
FIG._3
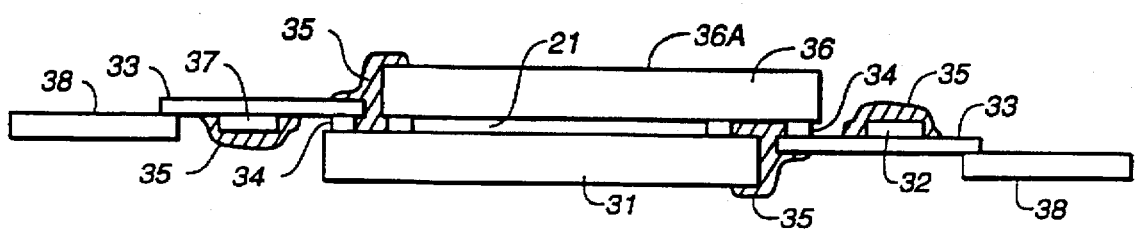
FIG._4

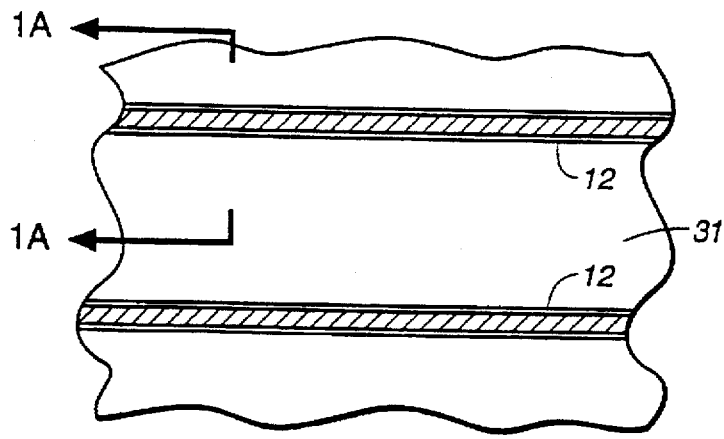
*FIG._2A*
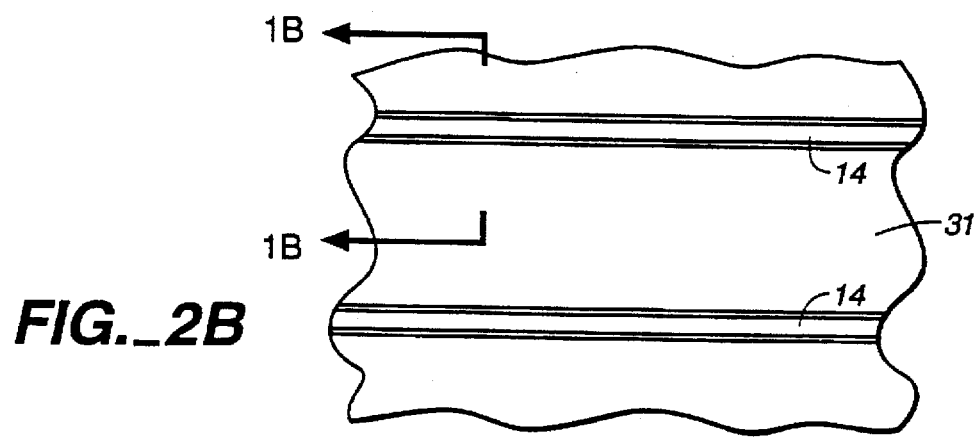
*FIG._2B*
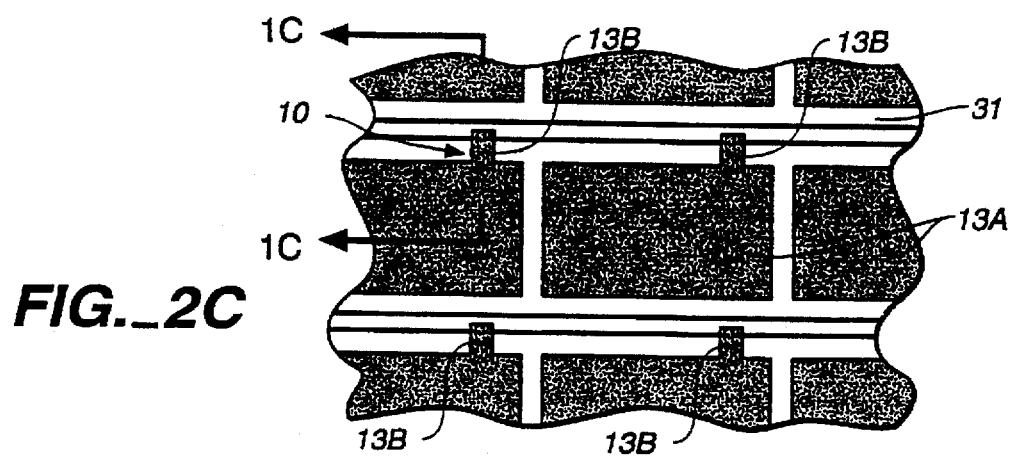
*FIG._2C*

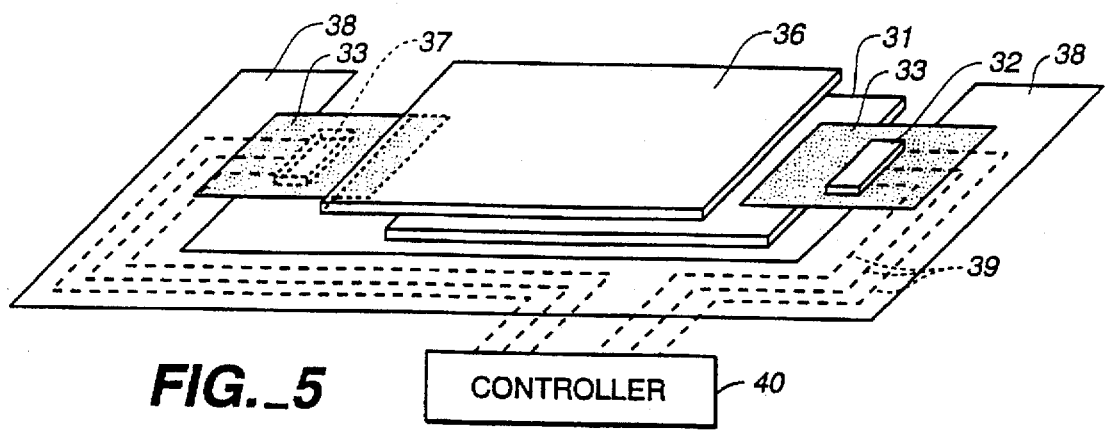
FIG._5
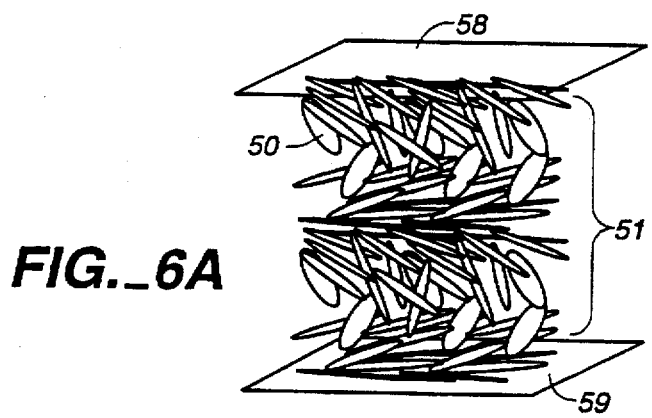
FIG._6A
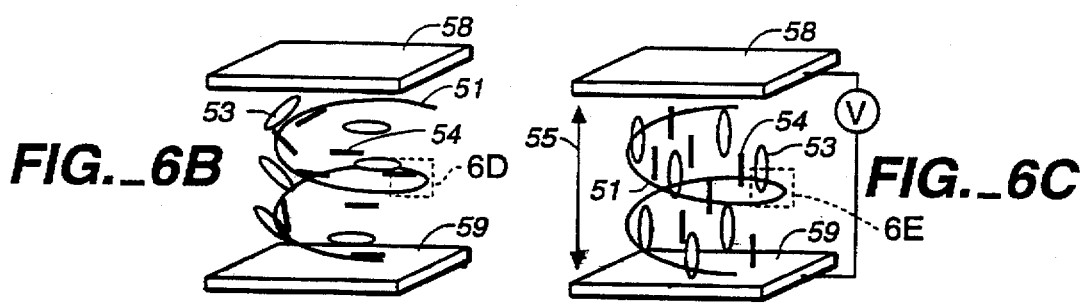
FIG._6B  FIG._6C
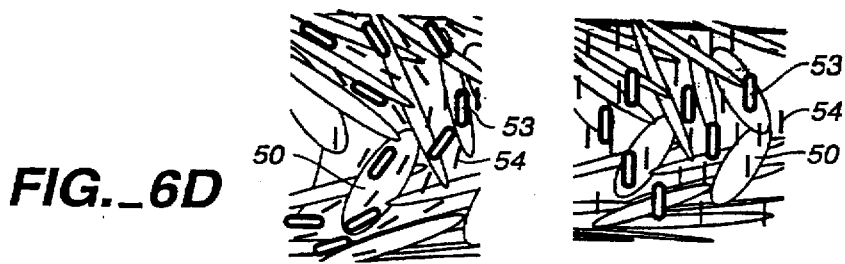
FIG._6D  FIG._6E

FIG._7A
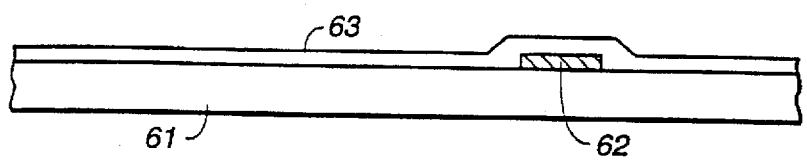
FIG._7B
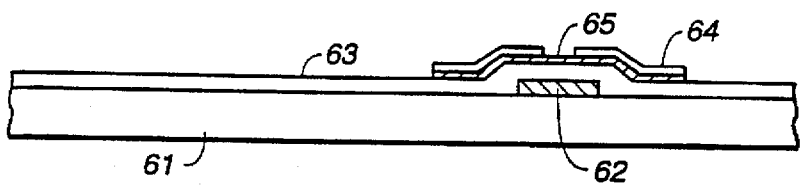
FIG._7C
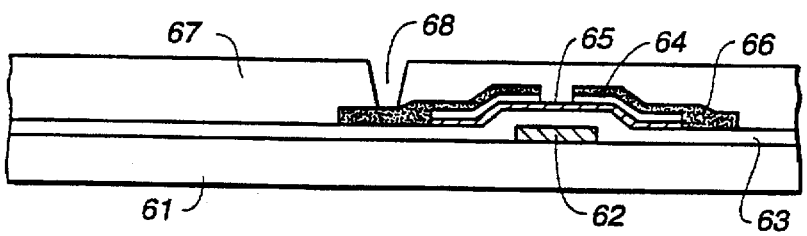
FIG._7D
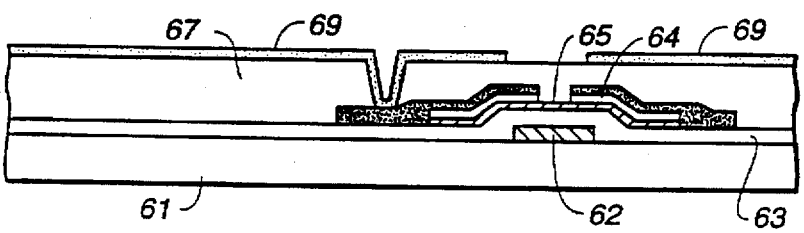
FIG._8
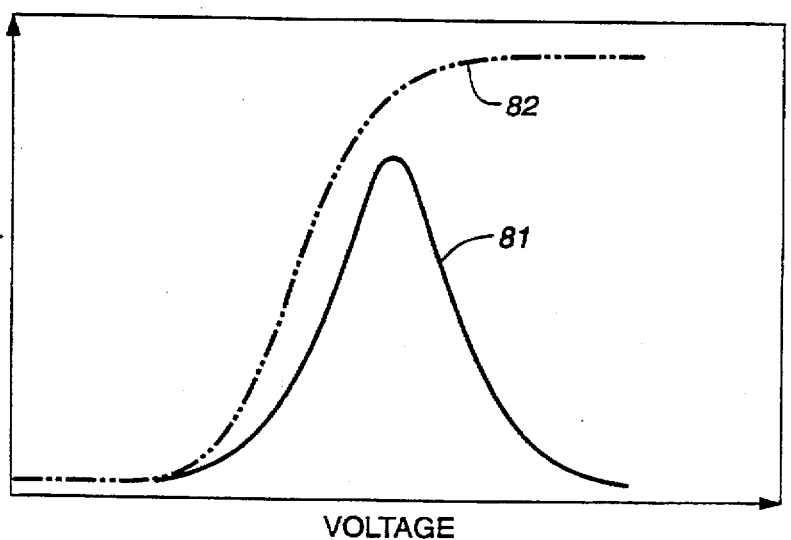

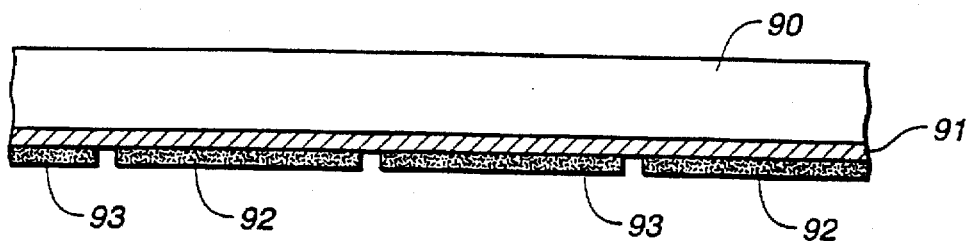
FIG._9
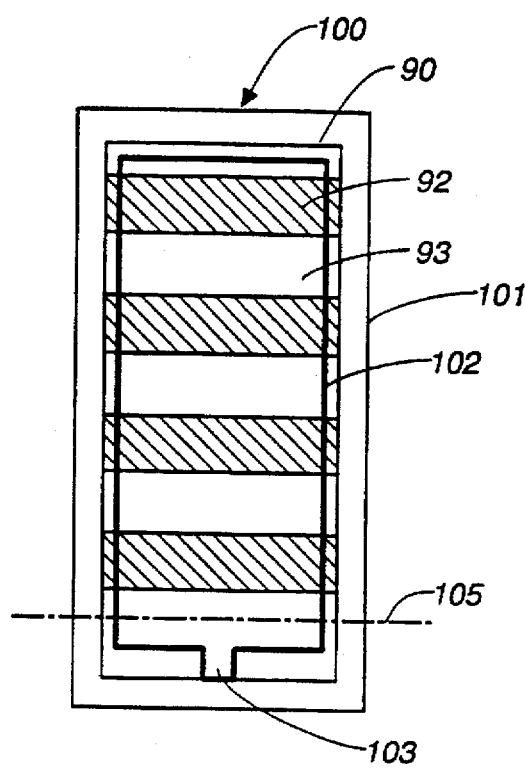
FIG._10
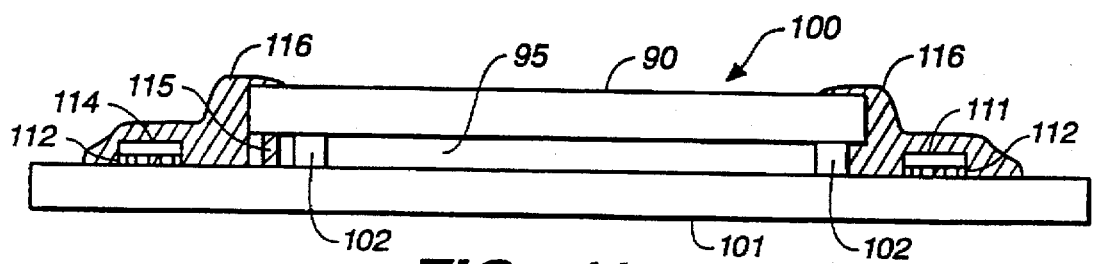
FIG._11

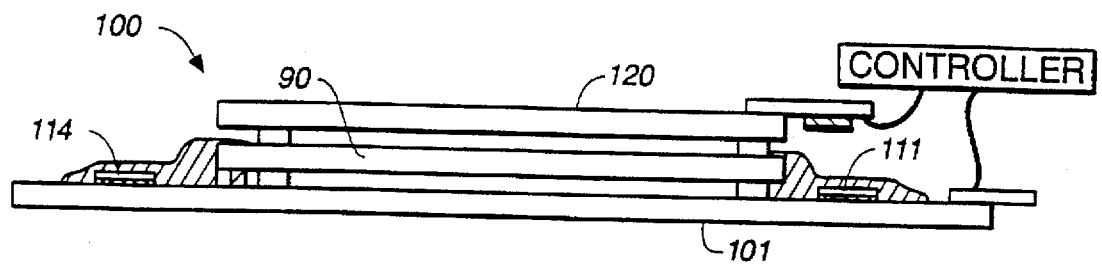
FIG._12
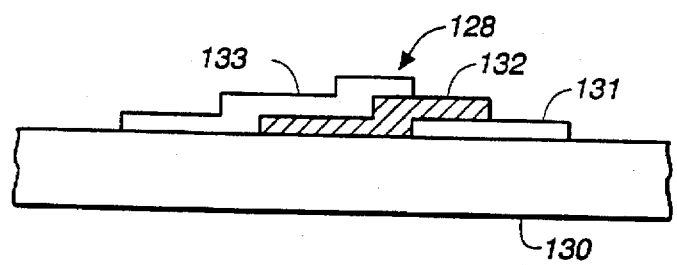
FIG._13
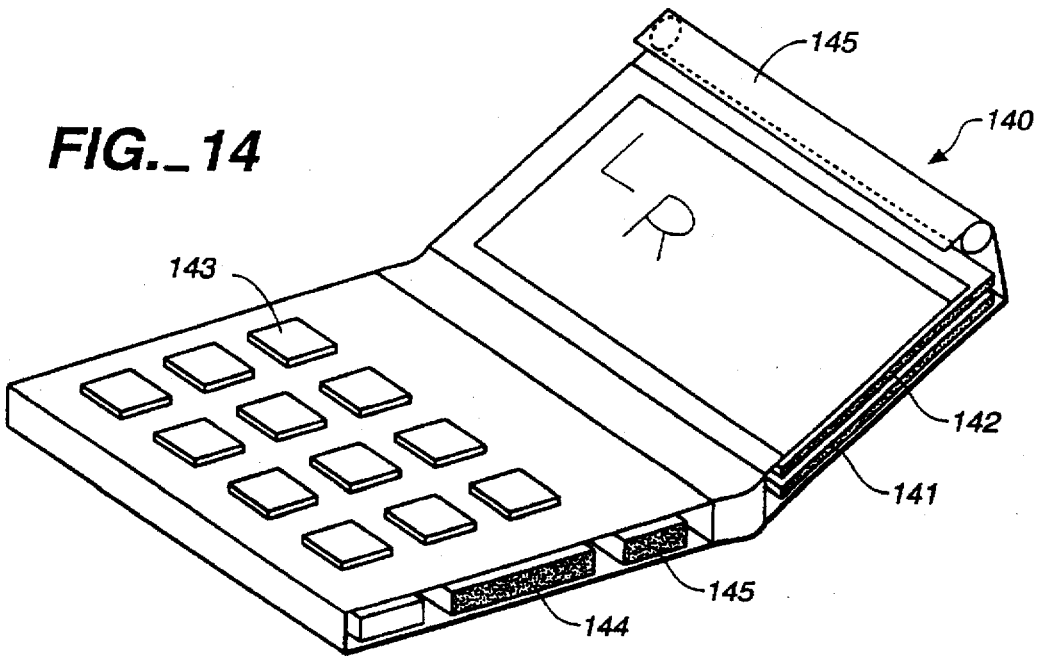
FIG._14

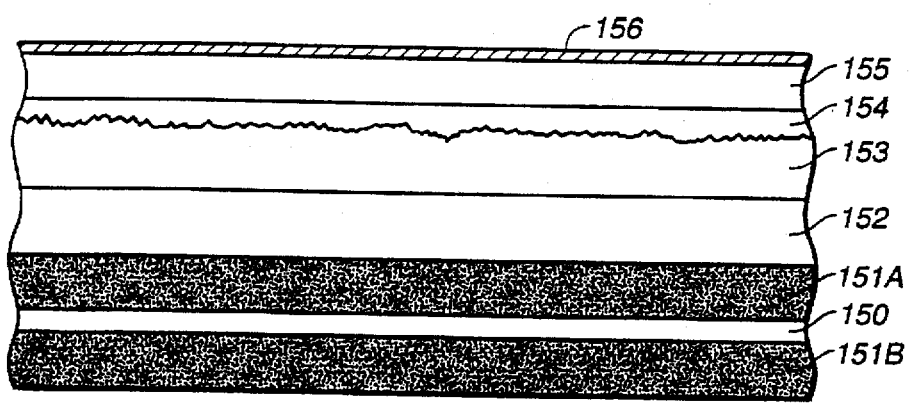
FIG._15
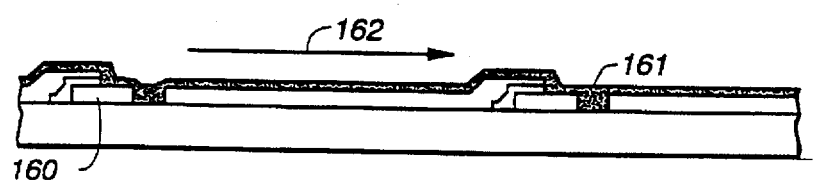
FIG._16A
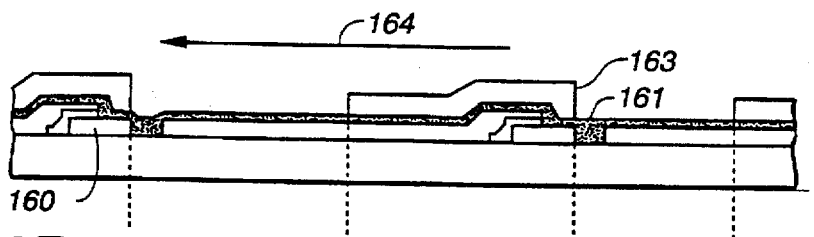
FIG._16B
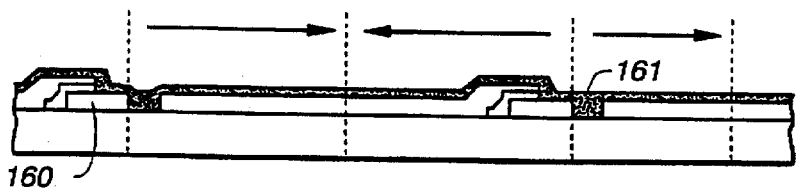
FIG._16C

FIG. _17
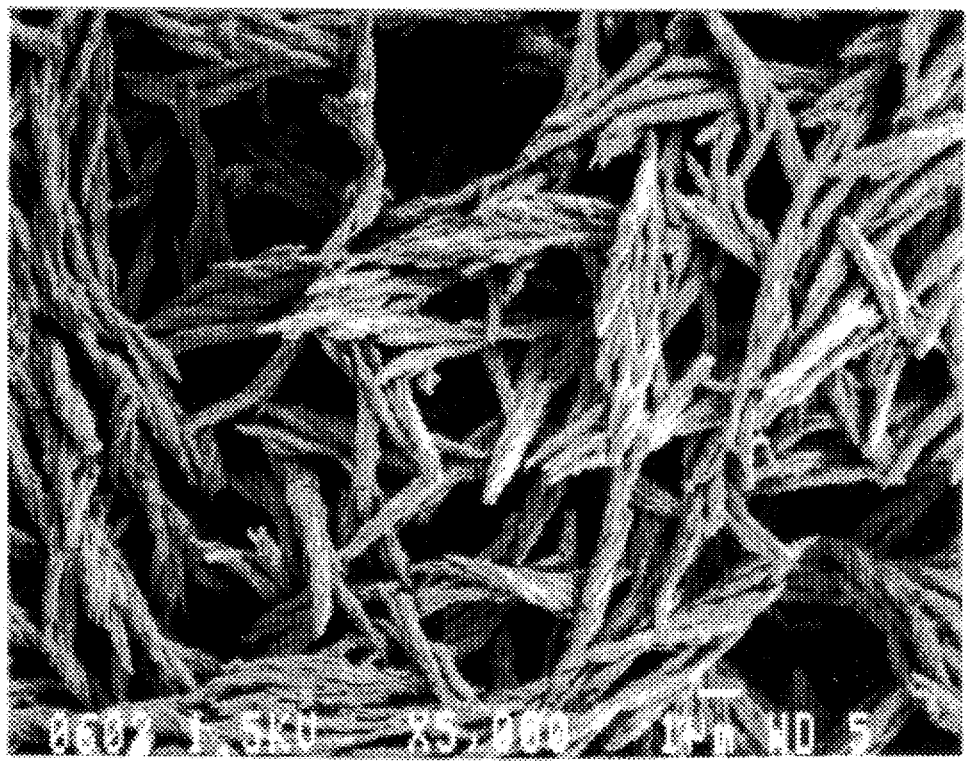
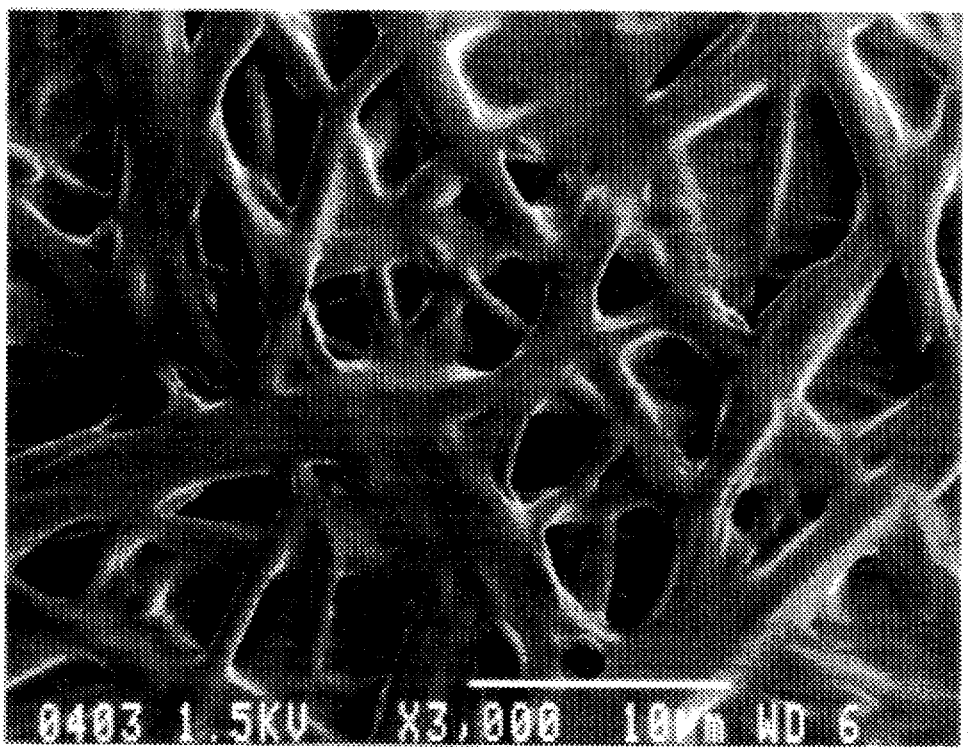
FIG. _18

POLYMER DISPERSED LIQUID CRYSTAL (PDLC) DISPLAY APPARATUS

CROSS REFERENCE TO RELATED APPLICATIONS

This application is a continuation-in-part of patent application Ser. No. 07/798,478, filed Nov. 26, 1991, now U.S. Pat. No. 5,305,126, issued Apr. 19, 1994, which is incorporated herein by reference thereto.

BACKGROUND OF THE INVENTION

This invention relates generally to an LCD unit employed in data display apparatus, such as, computers, TV apparatus, and projectors, and more particularly to reflecting type, PDLC display apparatus providing improved contrast and more true white and contrasting black or color similar to that capable with conventional CRT screens.

Recent advances in portable data apparatus, including a reduction in their size, such as, hand-held and laptop computers, have led to widespread use of this type of equipment. Because of low power requirements of this apparatus as well as their thin profile and their light weight, LCDs are employed as displays in this type of equipment. Considerable interest exists and is maintained in the future use of LCDs in desktop information systems from a space-saving standpoint.

A number of lightweight and thin profile display panels featuring liquid crystal material as the display medium have been developed. In particular, display panels, such as those having the TN mode with a twist angle of 90°, and the STN mode with a twist angle in the range of 180° to 270°, have attracted considerable attention for commercial use in liquid crystal display panels having a liquid crystal medium held between spatially disposed substrates, wherein alignment of the liquid crystal molecules is accomplished in response to the application of an electric field and transmitted light through the liquid crystal medium is detected through the use of polarizers. The development of display panels with a 90° twist angle using non-linear devices, such as, MIM devices, have been recently advanced to production level for the fabrication in high-definition LCD apparatus. However, because these displays require two polarizers, they suffer from the utilization of a low level of the incident light due to blocking off a large portion of this light and, as a result, the display has an undesirable level of brightness, and also results in a limited viewing angle. As a result, these conventional displays require backlighting and, therefore, require high power consumption for the backlight lamps. Normally, therefore, the reflection type LCD panel desirable in these circumstances since the need for backlight can be eliminated.

The use of a conventional LCD panel, such as, a TN or a STN LCD panel, requires the employment of two polarizers in order to maintain adequate contrast for viewing. Therefore, these panels require a standard configuration comprising the following physical order of components: [polarizer—substrate—liquid crystal medium—substrate—polarizer—reflector]. However, the presence of a substrate between the liquid crystal layer and the reflector causes the double displayed image of characters, due to double interfaces that reflect light thereby degrading the quality of the display. One way to reduce this problem of double displayed image is to reduce the thickness of the bottom substrate, usually comprise of glass. However, the fabrication of extremely thin glass substrates is difficult, and very thin glass plates are fragile to handle and, therefor, are unsuitable for use in portable equipment. Moreover, because most of the light is absorbed by the polarizer, even a white display appears dim, and is difficult to see with the ordinary eye. To solve this problem, the employment of thin polymer films as substrates has been devised. However, because the conventional LCD mode presupposes the use of a polarizer, any polymer film employed for this purpose should have the property of not affecting the polarization properties of the adjacent polarizer. Such polymers are difficult to fabricate, and LCD panels incorporating these polymers are expensive. Further, as long as a polarizer is employed, the absorption of light by the polarizer renders the white display less than completely bright and makes the attainment of a "paper white" display difficult, if not effectively impossible.

Conventional LCD panels are often employed in conjunction with data input devices, for example, hand-held tablets, which in many cases detect input positions by employing a stylus, pen or human finger by sensing the pressure exerted by the use of such an input device. If the LCD panel employing a polarizer is combined with any of these input devices, the pressing force applied will also reach the LCD panel. This pressure on the panel changes the birefringence value, And, of the display, as well as changing the display color, in the vicinity of the spot at which a pressure applied, position detection is performed on the display. This significantly degrades display quality and renders the input characters difficult to recognize. If a shock absorber is provided in order to prevent the pressing force from reaching and affecting the LCD panel in this manner, the configuration increases both the weight and contour thickness of the apparatus, which runs in the direction of defeat of the purpose of producing a thin, lightweight, portable LCD apparatus.

On the other hand, there are LCD panels that utilize modes of operation that do not require the use of a polarizer. Among the conventional LCD modes that do not require the employment of a polarizer are the dynamic scattering (DS) mode and the guest host (GH) mode, which are widely known. The DS mode was employed in early versions of LCD timepieces, such as, pocket calculators, and small display devices. When an AC voltage, with a frequency less than a prescribed value, is applied to a parallel, aligned liquid crystal layer or medium endowed with conductivity properties and having a relatively low specific resistance, such as, less than $10^{10}$ Ω·cm, above a certain voltage, the liquid crystal layer changes into a state in which the liquid crystal molecules assume random orientation. This generates numerous minute regions of birefringence whose orientation differs from the orientation of molecules in the surrounding areas. As a result, light is strongly scattered in these regions. Consequently, in the DS mode, the liquid crystal is transparent in the absence of an electric field, and becomes whitish in appearance due to the scattering of the incident light when an electric field is applied. Thus, the DS mode offers the advantages of not requiring a polarizer and does not have low viewing angle dependency. On the other hand, because of its required high operating voltage and low specific resistance, the DS mode consumes a comparatively high level of power and cannot be driven by the use of active devices, such as, TFT devices or MIM devices.

The GH mode displays data through the employment of the anisotropic effects achieved through the absorption coefficient of the dichroic dye added to the liquid crystal material forming the liquid crystal medium. Dichroic dye has dye molecules that are of rod shaped configuration and these rod like molecules align themselves parallel with the aligned direction of the liquid crystal molecules in the medium.

Thus, changing the alignment direction of the liquid crystal molecules through the application of an applied electric field causes a change in the alignment direction of the dye molecules. The dye molecules have an appearance of being either of color or transparent, according to their alignment direction, and with the application of an electric field, it is possible to switch between the color state and clear state.

In the GH mode, there are three operational display methods that may be employed that do not require the use of a polarizer. These methods are (1) the ¼ wavelength plate-type, (2) the phase transition type, and (3) the double-layer type. In the ¼ wavelength plate type method, the wavelength plate is dependent on the viewing angle and, for this reason, a wide viewing angle cannot be achieved. The phase transition type method requires a high drive voltage and, therefore, suffers from the drawback of hysteresis and the existence of intermediate states. The double-layer type method requires the stacking or back-to-back use of two liquid crystal panels and, therefore, has attendant doubling of costs and increasing the weight of the LCD apparatus. Moreover, the problem of double displayed image also accompanies the use of this method.

The development of LCD panels that do not require a polarizer has been taken up with renewed interest in recent years. These panels exploit the use of a liquid crystal/ polymer medium comprising a matrix of liquid crystal material and polymers utilizing the optical phenomenon of light scattering to provide for contrast between ON and OFF states. In the fundamental mode of operation, these panels scatter incident light in the absence of an applied electric field providing for a white looking display. In the presence of an applied electric field, a transparent display is provided. U.S. Pat. No. 4,435,047, for example, discloses an operational mode in which liquid crystal material exists in the form of isolated droplets in a Swiss cheese-like matrix composed of polymer material. In the absence of an applied electric field, the liquid crystal material in each droplet is oriented in a random fashion due to the effects imposed upon it by the polymer matrix. In this case, the incident light undergoes scattering and the display has a whitish appearance. When an electric field is applied, the liquid crystals within the isolated droplets orient themselves in the direction of the electric field. This alignment permits the liquid crystal material to provide for the passage of incident light, and the liquid crystal material has a transparent appearance. If dichroic dye is mixed with the liquid crystal material, there is scattering of incident light by the liquid crystal material in the absence of an electric field and the absorption of light by the dye causes the liquid crystal material to have a color appearance. When an electric field is applied, the dichroic dye also orients itself in the direction of the applied electric field, along with the liquid crystal material, and, consequently, the liquid crystal material permits the passage of incident light having a transparent appearance.

U.S. Pat. No. 4,707,080 discloses a further mode wherein the formed liquid crystal droplets, as described in U.S. Pat. No. 4,435,047, are interlinked. In this mode, the droplets behave in the same way with respect to the electric field as the behavior described in U.S. Pat. No. 4,435,047.

European patent EP 313053 and Japanese Laid Open publication No. 1-198725 describe a mode in which continuous liquid crystals, having positive dielectric anisotropy, are diffused in either a 3-dimensional network matrix or a grid-like polymer matrix. In these cases, the behavior of the liquid crystal relative to the absence and application of an electric field and the underlying scattering principle is the same as described in the above mentioned U.S. patents. In the absence of an applied electric field, the scattering of incident light produces a whitish appearance or white turbidity, and in the presence of an applied electric field, the appearance is transparent.

In addition to the fundamental operational mode described above, another mode has recently been proposed in which the liquid crystal material appears transparent when an electric field is not applied to the liquid crystal/polymer medium and the liquid crystal appears whitish due to the scattering of incident light when an electric field is applied. U.S. Pat Nos. 4,994,204, 5,240,636, and 5,093,471, for example, disclose a mode in which the liquid crystal droplets are diffused or dispersed in a polymer that exhibits a liquid crystal property or are dispersed in a polymer that have liquid crystal side chains. These polymers are thermoplastic polymers. Although this mode is bistable, in the absence of an electric field, for example, the liquid crystal appears transparent, and when an electric field is applied the liquid crystal appears whitish due to the scattering of incident light. This mode, however, suffers from the drawback of low reliability because the side chains exhibiting a liquid crystal property contain cyano groups, and a low glass transition temperature and low heat resistance because the liquid crystal side chains are connected by means of a spacer.

U.S. Pat. No. 5,188,760 discloses a further mode in which an anisotropic gel, consisting of polymerized liquid crystal material and unpolymerized low-molecular weight liquid crystal material, is employed. In this mode, the polymerized liquid crystal provides the function of a polymer matrix. Also, in this mode, the use of low-molecular weight liquid crystal monomers that exhibit a liquid crystal property is essential. In terms of the behavior of the gel relative to an applied electric field, in the absence of an applied electric field, the gel appears transparent, and in the presence of an applied electric field, the gel has whitish appearance.

In employing liquid crystal/polymer type mediums, LCD panels have been developed that exploit the principal of the scattering of incident light. However, most of these panels regulate the scattering and transmission of light by means of an applied electric field. This poses several problems when one attempts to achieve a "paper white" display, i.e., a display that has appearance of a pure white contrast. Specifically, the "paper white" display seeks to produce such an absolute white/black contrast display, wherein a white display based upon light scattering when the liquid crystal/ polymer medium is placed in a whitish state, and a black display based upon light absorption by light absorption that occurs when the liquid crystal/polymer medium is placed in a transparent state. For such a black-and-white display, a standard configuration comprising the following physical order of components is required: [substrate—liquid crystal/ polymer medium—substrate—light absorber or substrate— liquid crystal/polymer liquid crystal/polymer medium— light absorber—substrate]. However, the provision of a substrate between a liquid crystal/polymer medium and a light absorber causes characters to be displayed in double displayed images. If the two components are positioned in direct contact with each other in order to solve the problem of double displayed image, the transparency of the color of the light absorption medium provides a dim whitish tone when the display mode is provided through the employment of light scattering. If the thickness of the liquid crystal/ polymer medium in, then, increased in order to prevent this problem of transparency, white appearance will become brighter, but in the other state, the black appearance becomes grayish in tone due to a decrease in the transmissivity of the liquid crystal/polymer medium. Either approach fails to produce satisfactory results of providing a display with a bright white/black contrast.

The operational mode wherein dichroic dye is mixed in the liquid crystal droplets, as described in U.S. Pat. No. 4,435,047 et al., a light scattering body like paper or a diffuser plate for displaying a good white appearance is provided in place of using a light absorber, as previously mentioned. When an electric field is applied, the liquid crystal/polymer medium becomes transparent. As a result, the light scattering body becomes transparent producing a display having a whitish appearance. This mode, however, is also afflicted by the foregoing mentioned problems. Specifically, in the absence of an applied electric field, the scattering of light by liquid crystals and the absorption of light by the dye occurs simultaneously in the liquid crystal/polymer medium. This causes intermingling of black and white, rendering its black display mode to have a grayish tone. Conversely, if the amount of dichroic dye is increased in the liquid crystal/polymer medium in order to make black display mode have a darker black appearance, the black appearance is improved, but it renders white display mode darker due to a decrease in transparency when an electric field is applied.

Thus, in today's standard and proposed LC displays, a truly high quality black/white display so far have not been realized in the LCD art.

It is an object of this invention to provide a novel display mode capable of switching between an absorption mode and a scattering mode utilizing a liquid crystal/polymer type medium.

It is another object of this invention to provide different types of PDLC display panels and their apparatus of high display quality and portability employing a new display mode comprising this invention.

SUMMARY OF THE INVENTION

According to this invention, a polymer dispersed liquid crystal (PDLC) display apparatus comprises a composite liquid crystal/polymer medium comprising a liquid crystal material and polymer, which are phase-separated from each other, and a dichroic dye formed between opposed substrates having orientation processed surfaces. A light-scattering effect is developed when the liquid crystal material aligns with an applied electric field, wherein initially the liquid crystal material and the polymer align in the same direction when no such electric field is applied. The liquid crystal/polymer composite layer is sandwiched between the two substrates each having a transparent electrode on an inner surface, or is formed on a single substrate having a reflecting electrode formed on a surface with a transparent electrode formed on the top surface relative to liquid crystal/polymer composite layer. The liquid crystal material may have a positive dielectric anisotropy so that the liquid crystal material and the polymer are aligned in a direction parallel to the planar surfaces of the substrates when subjected to an electric field. On the other hand, the liquid crystal material may have a negative dielectric anisotropy so that the liquid crystal material and the polymer are aligned perpendicular to the planar surfaces of the substrates when subjected to an electric field.

As used herein, "liquid crystal/polymer medium" means a light modulating layer or attenuating layer or light absorption layer or light scattering layer having a liquid phase and solid phase, e.g., a liquid crystal material and polymer or its precursor, wherein the liquid phase is affected by alignment to an applied electric field but remains substantially aligned with the polymer structure when an applied electric field is not present.

The liquid crystal/polymer medium of this invention is a PDLC medium comprising a spatial disposition of both discrete polymer particles and/or continuous particle-like polymer string structures that are held or fixed between spatially disposed substrates. In the case of a reflecting type PDLC apparatus, a reflecting medium is applied to the surface of one of the two substrates. These polymer structures may take on a molecular connected structure between the substrates, e.g., a series of particle-like polymers are formed in connected helical-like structures between the spaced substrates. These polymer structures may also be formed in a matrix or grid structure. The discrete or continuous particle-like polymers are aligned and spatially disposed in a prescribed direction by virtue of the orientation processing performed initially on at least one of the substrates. A portion of the liquid crystal/polymer composite layer remains in a liquid state.

An important aspect of this invention is that, in the absence of an applied electric field, the optical axes of the liquid crystal are in approximate agreement with optical axes of the formed micro network structure of the polymer. In the case where there is a series of particle-like polymers forming a plurality of polymer helicoids so that, in the absence of an electric field applied to the liquid crystal/polymer medium, the liquid crystal molecules and the dichroic dye molecules will align themselves substantially with the polymer helicoids due to the influence of the polymer helicoids on these molecules. Therefore, the incident light entering the liquid crystal/polymer medium will be absorbed by the dichroic dye, resulting in a substantial reduction in its intensity upon reaching the opposite side of the layer. This light that is not initially absorbed and passing through the liquid crystal/polymer medium is thereafter reflected by the reflecting medium positioned at the interface with the liquid crystal/polymer medium and reenters the liquid crystal/polymer medium where it is absorbed by the dichroic dye and is further reduced in substantial intensity. Compared to the case where a reflecting medium is not provided in proximity to the liquid crystal/polymer medium, there is a significant increase in the efficiency of light absorption and resulting improvements in contrast with the use of the reflecting medium.

When an electric field is applied across the liquid crystal/polymer medium, the liquid crystal molecules that are attracted by the electric field and the molecules will substantially aligned along the direction of the applied electric field. Concurrent with this field alignment, the dichroic dye also orients in the direction of the applied electric field. As a result, only a small amount of the incident light entering the liquid crystal/polymer medium is absorbed by the dichroic dye. When an electric field with an intensity capable of changing the orientation of the liquid crystal molecules is applied, the polymer helicoids that are oriented in a specifically fixed and aligned direction undergo little change, if any, in their position. This produces a difference in the refractive indices between the liquid crystal material and either the polymer particles or the polymer helicoids thereby causing some portion of the incident light to be scattered. Any portion of the incident light that is not scattered passes through the liquid crystal/polymer medium and is reflected by the reflecting medium provided in the vicinity of the liquid crystal/polymer medium and reenters the liquid crystal/polymer medium, where it is again subject to scattering by the difference in refractive indices between the liquid crystal material and the polymer helicoids. As a result, there is a significant increase in the efficiency of light scattering and corresponding improvements in contrast, compared to the case where a reflecting medium is not employed.

In the absence of an applied electric field, the PDLC apparatus utilizing the liquid crystal/polymer medium of this invention has colored appearance due to the absorption of the incident light by the dichroic dye. When an electric field is applied, the portion of the liquid crystal/polymer medium influenced by the electric field has a whitish appearance due to light scattering. Thus, by controlling the liquid crystal/polymer medium so that an electric field is applied only to portions forming a series of pixels representing displayed letters, characters, and other kinds of information, this information is displayed in white against a highly contrasting colored background. Likewise, by controlling liquid crystal/polymer medium so that the application of an electric field is withheld from portions that display letters, characters, and other types of information, while an electric field is applied to the remainder of liquid crystal/polymer medium forming this information, the information can be displayed in colors against a white background.

The PDLC apparatus achieved with the application of this invention may be connected to IC circuits designed to control the application of the applied electric field to pixels formed in the liquid crystal/polymer medium for providing a PDLC display in an information processing equipment, such as, a computer, electronic notebook, or television screen.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 1A, 1B and 1C are cross sectional schematic views of a first embodiment comprising a MIM device utilized in a polymer dispersed liquid crystal apparatus comprising this invention, which views are, respectively, taken along the lines 1A—1A, 1B—1B, and 1C—1C of respective FIGS. 2A, 2B and 2C.

FIGS. 2A, 2B and 2C are corresponding plan views of the respective views of FIGS. 1A, 1B and 1C comprising the first embodiment of this invention.

FIG. 3 is a schematic perspective view of a MIM substrate structure of FIG. 1 in combination with a counter electrode substrate.

FIG. 4 is a schematic cross sectional view of the finished polymer dispersed liquid crystal apparatus of FIG. 1 with driver units attached to the apparatus.

FIG. 5 is a schematic perspective view of the polymer dispersed liquid crystal apparatus of FIG. 1 with driver units attached to the apparatus.

FIGS. 6A–6E are schematic cross sectional views of the liquid crystal/polymer dispersion medium comprising a continuous polymer body, liquid crystal material, and dichroic dye of this invention for purposes of explaining optical and physical properties of the medium. FIG. 6A illustrates the continuous polymer body as formed between supporting substrates. FIGS. 6B,D illustrate the state of orientation of the liquid crystal/polymer dispersion medium in the case of field-OFF conditions. FIGS. 6C,E the state of orientation of the liquid crystal/polymer dispersion medium in the case of field-ON conditions.

FIGS. 7A–7D are cross sectional schematic views of a second embodiment comprising a TFT device utilized in a polymer dispersed liquid crystal apparatus comprising this invention.

FIG. 8 is a graphic illustration of the applied voltage characteristics for the first and second embodiments when employing reflective pixel electrodes.

FIG. 9 is a cross sectional schematic view of the counter electrode substrate of the apparatus comprising this invention including a color filter comprising the third embodiment of this invention.

FIG. 10 is a schematic plan view of the third embodiment of this invention showing the sealing arrangement between the device substrate and counter electrode substrate of the apparatus comprising this invention.

FIG. 11 is a cross sectional view of the third embodiment showing the sealing arrangement between the device substrate and counter electrode substrate of the apparatus comprising this invention.

FIG. 12 is a cross sectional view of the third embodiment with a transparent touch panel employed in connection with the apparatus comprising this invention.

FIG. 13 schematic cross sectional view of a MSI substrate structure comprising a fourth embodiment of this invention.

FIG. 14 is schematic perspective view of a polymer dispersed liquid crystal apparatus in the form of a portable computer for the fourth embodiment of this invention.

FIG. 15 is a schematic cross sectional view of a fifth embodiment of a polymer dispersed liquid crystal apparatus comprising this invention utilizing an anti-reflection film.

FIGS. 16A–16C are schematic cross sectional views of a TFT substrate structure with a reflective pixel electrode comprising a sixth embodiment of this invention with individual display pixels having different medium orientations.

FIG. 17 is a electron micrograph of showing the polymer helicoids formed by a liquid crystal/polymer dispersion medium of this invention.

FIG. 18 is a electron micrograph of the mesh-like matrix formed by a liquid crystal/polymer dispersion medium of this invention.

DESCRIPTION OF THE PREFERRED EMBODIMENTS

The cross sectional views of FIGS. 1A–1C and the plan views of FIGS. 2A–2C are for the purpose of illustrating fabrication of a PDLC apparatus having reflection-type pixel electrodes to provide a black-and-white display. The PDLC apparatus utilizes MIM devices, which operate as nonlinear devices for turning ON and OFF designated pixels. These MIM devices are formed on a substrate and are generally fabricated as follows. As shown in FIGS. 1A and 1B, a first conductor in the form of a Ta film, approximately 2,500 Å thick, is formed by sputtering, such as, by means of vapor deposition, on glass substrate 31. The Ta film is selectively etched by photo-etching forming a pattern comprising Ta electrodes 12. This processing is also utilized to form the wiring for the data lines to the MIM pixel electrodes 15 for each pixel position.

Next, Ta oxide film 14 is formed on the surface of Ta electrode 12 by anodizing the Ta electrode 12 in an aqueous solution of citric acid 0.01% by weight. This process anodizes portions of the Ta material comprising the conductive data lines thereby forming an insulating layer. This is followed by the deposition and selective etching of a second conductor 13, for example, Cr, via sputtering, which will comprise both the pixel electrode 13A and is formed over a side edge and a portion of the top of oxide film 14, as best seen in FIG. 2C at 13B, forming a portion of MIM device 10. Film 13 is formed by means of sputtering, e.g., vapor deposition of Cr to form a Cr film that is about 1,500 Å thick. The film is selectively photo-etched to achieve the desired pattern forming reflecting pixel electrode 13A with one portion 13B of electrode 13A formed over a portion of oxide film 14. Thus, MIM device 10 comprises Ta electrode 12, serving also as a data line, insulating film 14 and second conductor portion 13B which is partially formed on a surface of insulating film 14.

Counter electrodes 22 on glass substrate 36 is schematically illustrated in FIG. 3 and, as combined with MIM device substrate 31, forms a plurality of orthogonal cross points comprising the pixels making up the display. Counter electrodes 22 are formed by sputtering a vapor deposited ITO film 22 approximately 1,500 Å thick on glass substrate 36. Film 22 is then photo-etched to form the parallel strips constituting electrodes 22.

Then, an alignment film is placed on MIM device substrate 31 and transparent counter electrode substrate 36 and a rubbing treatment is performed on the alignment films in a manner to form a 180° twist angle. Next, a gap spacer is formed along the edges after which the substrates are spatially secured and assembled by applying a sealing agent along the edge contour except for an inlet area where the liquid crystal medium will be injected into the spacing between substrates 31 and 36, which is an empty cell region with a 5.3 µm gap.

Next, a liquid crystal/polymer medium is prepared for injection into the empty cell region 21 (FIG. 4). A mixture comprising 0.7 g of a chiral component, Product No. S-811, available from the Merck Corporation, is mixed with 90.7 g of liquid crystal material, Product No. TL-202, also available from Merck Corporation is prepared. Then, a mixture of dichroic dye materials, comprising dyes identified as 0.7 g of Product Nos. M361 (yellow dye), 0.8 g of SI512 (violet dye), and 0.2 g of M34 (blue dye), are mixed. These dyes are available from Mitsui Toatsu Senryo. Then, 1.8 g of this dye mixture is dissolved in a mixture resulting in the liquid crystal/chiral component mixture for this embodiment. Also, 6.5 g of a UV hardening monomer, indicated by the chemical formula,

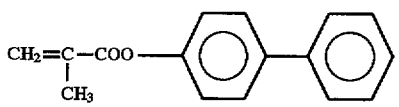

is blended with the mixture comprising the liquid crystal, chiral component and the dichroic dye, hereinafter identified as Mixture 1. This mixture exhibits nematic liquid crystal properties up to about 75° C. and converts into a isotropic liquid at about 75° C. Mixture 1 is then injected into the empty cell region employing the standard vacuum sealing method. Specifically, the sealed substrate structure is heated in a vacuum system to 50° C. The interior of the vacuum system is then vacuum-pumped to create a vacuum of about 0.05 mmHg. Next, Mixture 1 is then provided slowly into the cavity of the empty cell region. Then, the vacuum in the vacuum system is allowed to gradually return to atmospheric pressure until the entire area of the cell is filled. Then, the vacuum in the vacuum system is allowed to gradually return to atmospheric pressure. After this, the inlet through which mixture 1 was injected is sealed off.

Next, polymerization of the monomer is in order. To polymerize the monomer contained in the liquid crystal mixture, a UV light is employed irradiating the sealed liquid crystal mixture at about 50° for about 15 minutes using a UV intensity of 4 mW/cm² with a wavelength of about 350 nm. The UV light may have an approximate wavelength region of about 300 nm to about 400 nm. It is important to polymerize the mixture while in its liquid crystal state.

FIG. 17 shows an electron micrograph after removing the liquid crystal mixture from the polymerized liquid crystal/polymer medium. As FIG. 17 shows, the hardened polymer is composed of either discrete or continuously coupled polymer particles in spiral twisted alignment, i.e., are arranged in helicoids, between the substrate due to the alignment films and the chiral component. After such hardening, the polymer is composed of a plurality of particles, approximately 5 µm in length and 0.8 µm in diameter and are aligned in fixed relation in a series of helicoid patterns. Some of these particles may be separate or independent of the helicoid patterns but will be properly aligned vis a vis the formed helicoid pattern alignment.

In FIGS. 4 and 5, device drivers 32 are for driving electrodes 15 by applying an electric field to MIM devices 10 on MIM device substrate 31, and are connected through isotropic conducting sheet 34 using TAB tape 33. Similarly, counter electrodes 22 on counter electrode substrate 36 are connected to electrode signal drivers 37 through anisotropic sheet 34 using TAB tape 33. For purposes of simplicity, only a single driver 32 and 37 is shown in FIGS. 4 and 5, as a plurality of these drivers would be formed along opposite edges of the sealed substrate unit on the TAB tapes 33.

The connection junctions between the driver 32 and 37 and conducting sheets 34 are protected from environmental elements as well as line breakage due to handling by means of sealing resin 35. The PDLC apparatus is then completed by connecting it to mounting harness substrate 38 having a plurality of preformed leads 39 which connects drivers 32 and 37 to an appropriate controller 40. In FIG. 4, connected TAB tapes 33, drivers 32 and 37 and mounting harness substrate 38 are substantially within the plane of the spaced substrates 31 and 36. However, these components, alternatively, can be stacked on either of the substrate edges.

The completed PDLC apparatus, thus, forms a panel for mounting into a computer, electronic notebook, hand-held computer, TV unit or monitor device, and other information processing device for display of information.

FIGS. 6A–6E are schematic cross sectional views of a representative portions of the liquid crystal/polymer medium achieved with this invention. FIG. 6A is a general view illustrating only the polymer structure as fixed in position between two spatially disposed substrates 58 and 59 comprising either or both discrete and continuously coupled polymer particles 50. The discrete or continuously coupled polymer particles 50 is oriented and formed in a twisted pattern 51 comprising a plurality of polymer molecules 50 coupled in a layered, substantially end-to-end fashion and aligned in helical strings and patterns which extend partially or fully between spaced substrates 58 and 59. These helicoid strings are brought about by the effects of the chiral component.

As indicated, polymer particles 50 form a network of either discrete particles or series of continuous strings of particles, such as, in a connected spiral or helicoid formation. However, some particles may align in a fairly straight line in a prescribed direction. They may also be of a matrix or web form, rather than in a particle-like form. Some of the liquid crystal/polymer medium may contain only liquid crystal material. The important point, however, is that the optical axes, in the micro-structures constituting the liquid crystal molecules and the polymer particles are in approximate optical alignment when they exist in a condition where no electric field is applied between substrates 58 and 59. The network structure of a set of particle-like polymers 50 is also referred to as polymer helicoid or helicoids 51.

FIG. 6B is a schematic view of a helicoid 51 in the case when an electric field is not applied. An enlargement of a portion of helicoid 51 from FIG. 6B is shown in greater detail in FIG. 6D. In the liquid crystal/polymer medium in this case when no electric field is applied between substrates 58 and 59, liquid crystal molecules 53 and dichroic dye molecules 54 are oriented in a helically twisted manner due to the effects of polymer helicoid 51, i.e., are aligned along the helicoids 51 of the polymer particles 50. Because of this fact, when incident light enters the liquid crystal/polymer medium, almost all the light in the polarized direction is absorbed by the helically oriented dichroic dye molecules 54 and, as a result, the intensity of the light is decreased. Any unabsorbed light that passes through the liquid crystal/polymer medium is reflected by reflecting medium placed in proximity to the liquid crystal/polymer medium, and the reflected light is redirected back into the liquid crystal/polymer medium. This reflected light is further absorbed by dichroic dye molecules 54 resulting a further decrease in its light intensity. As a result, compared to the case where no reflecting material is provided in the vicinity, there is a substantial improvement in light absorption and a dramatic increase in contrast.

FIG. 6C is a schematic view of helicoid 51 in the case when an electric field is applied. An enlargement of a portion of helicoid 51 from FIG. 6C is shown in greater detail in FIG. 6E. Liquid crystal molecules 53 within the effective range of the applied electric field become oriented in direction 55 of the applied electric field. Also, dichroic dye molecules 54 become oriented in direction 55 of the applied electric field. As a result, there is little light absorption by dichroic dye molecules 54. However, polymer helicoid 51, which is substantially fixed in a helically twisted state, undergoes little, if any, positional change due to the force of the applied electric field. The difference in orientation between helicoids 51 and molecules 53, 54 creates a refractive index differential between liquid crystal molecules 53, 54 and polymer particles 50 or polymer helicoid 51, and results in scattering of a portion of the incident light entering the liquid crystal/polymer medium. Any light that passes through the liquid crystal/polymer medium, without being scattered, is reflected by reflecting medium placed in proximity to the liquid crystal/polymer medium, and the reflected light is redirected back into the liquid crystal/polymer medium, where it is again subject to scattering due to the refractive index difference between liquid crystal molecules 53 and polymer helicoids 51. As a result, there is a substantial increase in the light scattering effect, and a dramatic improvement in contrast, compared to the case where such a reflecting medium is not provided.

It should be noted that in connection with FIGS. 6B and 6C, only a single helicoid is shown for purpose of simplicity of explanation. However, in actuality, with respect to a single pixel electrode, there would be a plurality of helicoids formed relative to such a single pixel electrode with their helices aligned substantially in the same turning direction, i.e., left or right formed helicoids.

A PDLC apparatus constructed according to the first embodiment, utilizing the operating principals set forth in FIGS. 6A–6E, has a scattering ratio of 8%, as benchmarked relative to a standard white plate scattering level of 100%, in the case where no electric field is applied. The PDLC apparatus appears black because of the light absorption by dichroic dye molecules 54. When voltage is applied to an MIM device 10, with a voltage applied to the liquid crystal/polymer medium is approximately 6 V, the portions of the PDLC medium controlled to receive an applied electric field will have a whitish appearance due to the effects of light scattering. The level of scattering under these conditions is 75%. Similarly, by controlling MIM devices 10 so that an electric field is applied in an imagewise formation to produce letters and characters that displayed information, information can be displayed in the form of white letters and characters against a black background. Conversely, when MIM devices 10 are controlled so that an electric field is applied to portions not representing letters and characters that display information while an electric field is applied to regions of the display representing the background, information is displayed in the form of black letters and characters against a white background.

For the purpose of creating such a display device, it is possible to provide orientation film and insulation film between the liquid crystal/polymer medium and the reflecting medium without introducing the problem of double displayed images experienced with conventional reflective type LCDs.

In addition to MIM devices 10 being employed for operating the state of designated display pixels, other active devices may be employed, such as, lateral MIM devices, back-to-back MIM devices, MSI devices, diode ring devices, varister devices, a-Si-TFT devices, polysilicon TFT devices, Cd—Se-TFT devices, and self-aligning TFT devices. These active devices can be provided either one per pixel or multiple units per pixel, in order to provide for redundancy and correction to defective pixels in order to increase the yield of manufactured PDLC panels. As a general rule, the maximum voltage that can be applied to the liquid crystal/polymer medium is higher with the employment of a TFT device than with a MIM device. Therefore, the TFT device will yield a higher degree of light scattering when an electric field is applied. Therefore, a comparison of a TFT-based PDLC apparatus and an MIM-based LCD device indicates that the PDLC apparatus employing a TFT device produces a higher display quality. Thus, the TFT-based PDLC apparatus produces a higher degree of contrast because a bright, white display is created due to stronger light scattering.

Relative to MIM devices 10 employing Ta, the metals and insulators for the fabrication of such MIM devices may also be achieved by mixing various metals and oxides comprising Ta, Al, Cr, Mo—Ta alloy, $SiO_x$, $TaO_x$, $Al_2O_3$, ITO, Ti, Mo, W, and Si.

To improve the adhesion of the formed active devices, such as MIM devices 10, on the surface of glass substrate 31, an intermediate layer may be formed between substrate 31 and active devices 10. The material for the intermediate layer may be, for example, $TaO_x$. Under these circumstances, it can be seen the ease of fabrication of device 10 by, first, forming a $TaO_x$ adhesion layer on a glass substrate 31, followed by the formation of Ta electrode 12, followed by the formation of Ta oxide film 14, followed by the formation of the Cr MIM second conductor 13B and integral Cr pixel electrode 13A involving only Ta and its oxide, and either Cr for a reflecting surface pixel electrode or ITO for a transparent pixel electrode.

In order to form MIM devices 10, films of selected metals can be formed by reduced pressure CVD, plasma CVD, sputtering, ion-plating, vapor deposition, plating, coating, anodizing, and thermal oxidation. Then, mirror projections, steppers, and proximity equipment may be employed to pattern the resist, and selective patterns can be formed by either wet or dry etching techniques. The selective patterns may also be prepared directly by laser treatment.

While the above embodiment comprises a liquid crystal/polymer medium including a chiral component since the chiral component provides for greater viewing angle visibility to the observer. However, the basic invention is the utilization light absorption additive in combination with the liquid crystal material and polymer type material to form the liquid crystal/polymer medium. Moreover, the light scattering effect due to the differences in the refractive indices between the polymer material and the liquid crystal material, such as, in the case of an applied voltage wherein the liquid crystal and light absorption additive align with the applied field (the case of positive dielectric anisotropy), the light scattering effect is significantly enhanced with the reflection of light that was successfully transmitted through the medium by a reflecting surface, e.g., Cr pixel electrodes 13A, which reflected light is scattered when reentering the medium with the resulting appearance of high white turbidity. By the same token, in the case where no applied voltage is present, the light absorption effect due to non-aligned light absorption additive molecules, is significantly enhanced with the reflection of light that was successfully transmitted through the medium to the reflecting surface, e.g., Cr pixel electrodes 13A, which reflected light is absorbed when reentering the medium, with the resulting appearance of black. To be noted in this case is that the reflecting surface can be roughened to provided for scattering of light incident on its reflecting surface as well reflecting the light. Moreover, the resulting appearance can be reversed if a white plate is substituted for the reflecting surface, utilizing a medium having negative dielectric anisotropy is utilized, as explained in U.S. Pat. No. 5,305,126. Thus, upon application of an applied voltage wherein the liquid crystal and light absorption additive molecules misalign with the applied field (the case of negative dielectric anisotropy), the light scattering effect is achieved with the absorption of light, resulting in an appearance of black. The application of an applied field, on the other hand, provides for alignment of the light absorption additive and liquid crystal molecules with the polymer matrix permitting the transmission of light through the medium to the white plate, resulting in the appearance of white.

Thus, the preferred embodiment for the liquid crystal/polymer medium comprises a chiral component and light absorption additive in combination with the liquid crystal material and polymer type material. The liquid crystal material is the substantial portion of the volume of the medium, being around 90%. Polymerizing initiators may also be included, but are not essential in the manufacturing process of LCD panels employing the liquid crystal/polymer medium.

For the liquid crystal material, liquid crystal materials generally employed in conventional LCD apparatus may be employed with favorable results. In order to improve the degree of light scattering upon application of an applied electric field, liquid crystal materials with a minimum LC birefringence, Δn, of 0.15 are preferred. Conversely, a birefringence, Δn, value of 0.15 or less is desired for improving transparency in a color display mode in the case where an electric field is not applied and light is absorbed by dichroic dye; or in a transparent display mode where an electric field is applied and the difference in birefringence between the polymer and the liquid crystal material is relatively small. On the other hand, liquid crystal materials with a birefringence, Δn, value greater than 0.4 are not easily achieved. In the case of employing active driving devices, the liquid crystal material should have a specific resistance of $1 \times 10^9$ Ω·cm. A specific resistance of $1 \times 10^{10}$ Ω·cm is preferred from the standpoint of ensuring a high holding ratio and high display quality.

The following are preferred formulas #1 through #5 of liquid crystal materials employed in connection with this invention. In connection with these formulas, "n" is the number of substituted fluorine, F, molecules; "R" is an alkyl group, a cycloalkyl group or an alkoxy group; and "X" is H, F, Cl or CN.

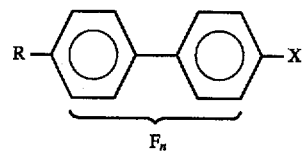

Formula #1

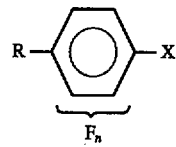

Formula #2

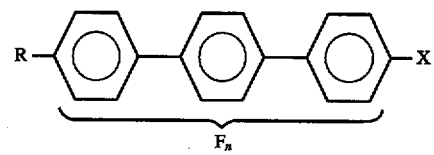

Formula #3

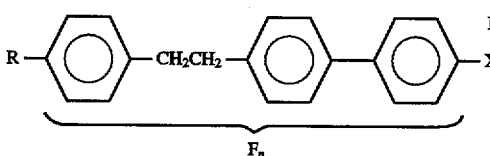

Formula #4

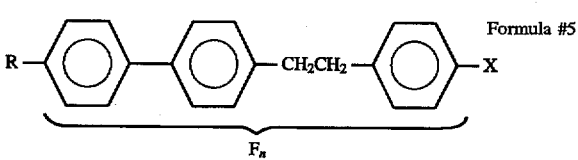

Formula #5

Substrate materials that may be employed in the practice of this invention are soda glass, quartz glass, alkaline-free glass, mono-silicon crystal, sapphire substrate, heat-hardening polymer, and thermoplastic polymer. There are no particular restrictions as to the types of polymers that may be employed, provided they do not adversely affect the liquid crystal/polymer complex held between the spatially disposed substrates. From the standpoint of availability, polyester sulfone, polycarbonate, epoxy-hardened resin, phenoxy-hardened resin, polyallyl ether, and other thermoplastics as well as ordinary heat-hardening resins may be employed in addition to polyethylene terephthalate. In cases where the requirements of low permeability to gases and moisture, scratch tolerance, but retaining some flexibility are of paramount importance, several resins may be combined together to form a single substrate composite. Further, various inorganic films, such as, SiO, $MgF_2$, $SiO_2$, $Al_2O_3$, MgO, $Ta_2O_5$, or ZnO, may be individually formed or combinations of these films laminated together on the viewing surface of the forward most substrate to function as anti-reflection and anti-scratching protective film. Both of the substrates on either side of the liquid crystal/polymer medium may be made of a suitable resin material. The counter electrodes or active device electrodes may be formed employing these polymer substrates.

As a reflecting medium, single metal materials, such as, Al, Cr, Mg, Ag, Au, and Pt, or combinations of these metals, may be employed. Further, combinations of Ag, Al, Cr, and Al—Mg are also desirable. From the standpoint of stability and reflectivity, Al—Mg mixtures are of particular desirability. From the standpoint of ease of manufacture of MIM devices, Cr is desirable metal material. The amount of Mg added should be in the range of about 0.1% to about 10% range by weight. The range of about 0.5% to about 5% range by weight is especially desirable for long time stability, high reflectivity and optical performance. As necessary, various optical laminated films may be utilized as a composite reflecting film. The reflecting material can include a conductive material to also function as the pixel electrodes or counter electrodes. Alternatively, separate materials having reflectivity and electrode properties may be employed as a combination of layers, and a transparent intermediate layer, serving as an electrical insulator, may be provided between a conductive reflecting layer and the transparent electrode layer. In cases where double displayed images of characters is tolerable, a liquid crystal/polymer medium and a reflecting medium may be provided on a supporting substrate. A light-absorption layer may also be provided on the side of the PDLC apparatus opposite from the viewer.

As the light reflecting medium may also be used a layer of a light reflecting surface, which may be provided adjacent to the liquid crystal/polymer medium. Preferably, the light reflecting surface comprises at least one layer of a metal or metal oxide. More preferably, the metal or metal oxide used to form the light reflecting surface comprises a metal selected from the group consisting of Al, Cr, Ag, Ni, Al—Mg alloy, Al alloy, and oxides thereof.

As chiral components, Product Nos. CB-15, C-15, S811, S1082, available from Merck Co., and Product Nos. CM-19, CM, CM-20, CM-21, and CM-22, available from Chisso Corporation, which employed generally for TN, STN, and FTN displays may be employed with favorable results. The amount of chiral components to be added to the liquid crystal/polymer medium is in the range of about 0.01% to about 10% by weight. The preferable range is about 0.1% to about 5% by weight. An amount less than about 0.01% by weight does not produce the desired effect, and an amount greater than 10% by weight tends to require a very high and unacceptable drive voltage. The temperature change in chiral pitch should be as small as possible.

For a light absorption additive, the following dichroic dyes, employed in the guest-host mode, may be employed: azo derivatives, anthraquinone derivatives, anphthoquinone derivatives, perylene derivatives, quinophthalone derivatives, azomethine derivatives and tolane derivatives. From the standpoint of light tolerance, anthraquinone may be employed, either by itself or, as required, in a mixture with other dye components. These dichroic dyes are employed in mixtures to provide for desired colors.

Moreover, reverse-type mode PDLC polymers may be employed. Examples of such polymers are polyvinyl alcohol, polyvinyl formal, and other thermoplastic polymers; epoxy and other heat-hardening polymers; and light-hardening resins that polymerize when irradiated with visible light, UV light, or by means of an electron beam. Among these polymers, the UV-hardening monomers are desirable for their ease in utility in the fabrication of liquid crystal panels. The UV-hardening monomers that are most often employed comprise mono-functional acrylate, di-functional acrylate, multi-functional acrylate, and their methacrylate compounds. For improvements in display quality, it is desirable that these monomers contain at least one benzene ring in their molecular structure. These monomers may also contain chiral constituents in their molecular structure, and they can be polymerized by UV irradiation, either by themselves or after blending with other monomers forming oligomers upon polymerization. The refractive indexes of these polymers should be chosen under the following consideration. If the white turbidity mode created by the application of an electric field is desired, the difference between the refractive index of a chosen polymer and that of the liquid crystal material with which the polymer is mixed should be made as large as possible. Conversely, if the transparent mode created by the application of an electric field is desired, the difference in refractive index of a chosen polymer and that of the liquid crystal material with which the polymer is mixed should be as small as possible.

When creating a hardened polymer from UV-hardening monomers, the intensity and the wavelength of the irradiating UV light, and the temperature at which polymerization is conducted by irradiation must be taken into consideration. These conditions vary among the monomers according to their chemical structures. However, these conditions are typically in the range of about 0.1 $mW/cm^2$ to about 40 $mW/cm^2$ in UV intensity; about 250 nm to about 450 nm in UV wavelength; and about 0° C. to about 100° C. in irradiation temperature. The preferable ranges are about 0.5 $mW/cm^2$ to about 30 $mW/cm^2$, about 265 nm to about 410 nm, and about 10° C. to about 80° C. If a low irradiation intensity is employed, incomplete reaction of monomers occurs. If an excessively high irradiation intensity is employed, a chemical break down can occur either to the monomers or to the already polymerized polymers and liquid crystals. Either extreme decreases the specific resistance of the liquid crystal/polymer medium and degrades the resultant display quality. The appropriate temperature for the application of the UV irradiation to the mixture is the temperature at which the liquid crystal/polymer mixture exhibits liquid crystal properties. A low reaction temperature slows down the rate of reaction and leaves many monomers in an unreacted state. A high reaction temperature, on the other hand, causes a high degree of thermal motion of the monomer molecules which inhibits their formation into their desired helical orientation.

Although the first embodiment, described above, employs a 270° twist angle, other twist angles are equally acceptable. The PDLC apparatus of this invention has the property of exhibiting different scattering directions according to the particular twist angle or orientation angle employed in the fabrication of the apparatus. Therefore, it is possible to create a display in a manner that produces the best possible display quality for a given viewing angle. To increase the viewing angle, two different directions of orientation or helicoid directions can be created relative to each pixel electrode. This is accomplished by different rubbing directions on the alignment film for each pixel electrode surface. This procedure is explained in more detail relative to the sixth embodiment in FIGS. 16A–16C.

The sealing method employed in this embodiment was the placement of the liquid crystal/polymer medium through an inlet into the empty cell region. However, depending upon the viscosity of the mixture, other sealing methods may be employed, such as, by placing the panel in a container of liquid crystal/polymer medium in a vacuum tank, or by making a PDLC film by pouring the liquid crystal/polymer medium onto a prepared substrate and sandwiching the medium between two substrates, or by making a PDLC film from the liquid crystal/polymer medium by printing or by employing a syringe.

In another aspect of this invention, one of the spatially disposed substrates 31 and 36, between which the liquid crystal/polymer medium is disposed, such as substrate 36, may be provided across the extent of its outer surface 36A with an array or matrix of microlens or lenticular lenses.

In the second embodiment of this invention, the liquid crystal/polymer medium employed in the first embodiment is also employed, but the active devices utilized in the PDLC apparatus are TFT devices. The TFT devices are formed on a substrate, and the process is described in connection with FIGS. 7A–7D showing cross-sectional views of the sequential fabrication steps. In this description, auxiliary capacitance, auxiliary capacitance electrode lines, and other components utilized in the circuitry of TFT devices have been omitted for the sake of simplicity since they have no direct bearing on the invention.

First, as shown in FIG. 7A, a thin film of Ta is formed by sputtering Ta onto glass substrate 61. Ta gate bus line 62 is created from this thin film employing conventional photolithographic techniques. Next, plasma CVD is employed to from silicon nitride film 63, which will form the gate insulator for the TFT. Then, as shown in FIG. 7B, a amorphous silicon film is deposited by plasma CVD and thereafter patterned into an island shape forming amorphous silicon film 65. This is followed by the plasma deposition and patterning of amorphous silicon film 64, which is thereafter ion implanted to form $n^+$ amorphous silicon film 64.

Then, as shown in FIG. 7C, a titanium film is sputtered onto the surface of film 64, and together with $n^+$ amorphous silicon film 64, the titanium film in patterned to form source/drain connection line 66. This is followed by the spin-coating deposition of insulating layer 67 on source/drain bus line 66. After applying photoresist, patterning and photo-etching processing is conducted to create contact hole 68.

Next, as shown in FIG. 7D, an Al—Mg alloy film is formed by sputtering and is patterned to form pixel electrodes 69. A silicon nitride film is then formed over the entire surface by means of plasma CVD forming an electrode passivation film. In this manner, a TFT device substrate 61 is created having reflecting pixel electrodes 69 connected to TFT devices through insulating layer 67.

A counter electrode structure for use with TFT device substrate 61 is fabricated by conventional techniques forming a sputtered transparent electrode film, composed of ITO and having a film thickness of about 2,000 Å, on the entire surface of a glass substrate, which film is thereafter patterned into a plurality of parallel counter electrodes. An empty cell region with a 5.3 µm gap was created by spatially assembling together TFT device substrate 61 with the counter electrode substrate in the same way as accomplished in the first embodiment.

FIG. 8 graphically shows the relationship between the applied voltage and the display characteristics achieved with the first and second embodiments. In FIG. 8, contrast curve 81 is in connection with the use of a MIM device and contrast curve 82 is in connection with the use of a TFT device. As shown in FIG. 8, there is little difference between these curves when the applied voltage is relatively low, in which case the appearance of the pixels is black. However, in the case of the TFT device, as the applied voltage is increased on the pixels, the medium becomes of high light scattering quality displaying an appearance of white such that the contrast increases with increasing applied voltage and, ultimately, a saturation point is reached, resulting in an S-shaped contrast curve.

On the other hand, in the case of the MIM device, as the applied voltage is increased, contrast reaches a peak at a prescribed voltage value beyond which any further increase in voltage reduces contrast, resulting in a bell shaped contrast curve. In terms of maximum contrast values, the TFT device exhibits higher contrast and, therefore, higher display quality. The reason for this is that the TFT device is a tri-terminal device with a high on/off ratio, whereas the MIM device is a bi-terminal device with a lower on/off ratio. Thus, in the case of the MIM device with its relatively lower on/off ratio, as the applied voltage is increased beyond a certain voltage value, the applied voltage will also affect adjacent pixel areas that normally are to remain in their black or OFF state. Therefore, in the neighborhood of a predetermined voltage value, wherein the applied voltage begins to leak to the OFF state pixels, the contrast curve reaches its peak. Any further application of voltage gradually turns the pixel that should be black or in OFF state into a gray appearance thereby reducing contrast. On the other hand, the TFT device does not exhibit this type of voltage leak, and, consequently, provides for higher contrast with increased applied voltage until saturation is reached.

Next, this is an explanation of a third embodiment utilizing a color filter in combination with a liquid crystal/polymer medium including a dichroic dye, the liquid crystal/polymer medium being driven by TFT devices, such as described in connection with the second embodiment. This embodiment provides for a black and white display which is also capable of providing a display with blue and yellow colors.

The PDLC apparatus of this embodiment is shown in FIGS. 9–11. The counter electrode substrate structure is shown in FIG. 9, a plane view of the cell structure is shown in FIG. 10 and side elevation is shown in FIG. 11. In FIG. 9, the entire surface of the counter electrode substrate 90 is covered with ITO film 91 on having a film thickness of about 1,500 Å. Then, employing conventional printing techniques (color pigment and adjunctive vehicle, e.g., resin wax material dissolved in organic solvent), a color filter is formed on the surface of film 91 for producing blue and yellow comprising alternate rows or patterns of blue pixels 92 and yellow pixels 93.

Alignment films are then applied employing conventional techniques to electrode surfaces of both TFT device substrate 101 (FIG. 10) and counter electrode substrate 90 (FIG. 9). Rubbing treatment is applied to the alignment films to provide for formation of a 90° twist angle between the substrates. Next, a gap spacer is formed on the periphery of the prepared surfaces, after which the two substrates are assembled together with the use of sealing agent 102, as shown in FIGS. 10 and 11, forming an empty cell unit 100 having an empty cell region 95 having a gap thickness of about 5.8 µm and inlet openings on opposite sides of the unit. The gap of empty cell region 95 is filled with a liquid crystal/polymer medium comprising Mixture 2. Mixture 2 comprises 3 g of a dichroic dye mixture consisting of 0.9 g of Product No. M361 (yellow dye, perylene derivative), 1.2 g of Product No. SI512 (violet dye, anthraquinone derivative), and 0.3 g of Product No. M137 (blue dye, anthraquinone derivative), all available from Mitsui Toatsu Senryo, and 0.5 g of chiral component, Product No. CB-15, available from Merck Company, dissolved in 89.5 g of a liquid crystal material, Product No. TL-213, available from Merck Company. Then, the mixture is finalized by adding 7.0 g of a UV-hardening monomer having the chemical formula,

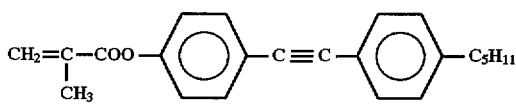

Mixture 2 is then placed in the liquid crystal container in a vacuum system. Empty cell unit 100 is placed in the vacuum system with inlet opening 103 to the interior of the cell positioned in a downward direction as shown in FIG. 10. The vacuum system is pumped down to a vacuum level of about 0.02 mmHg. Then, with inlet opening 103 oriented downward, the empty cell is gradually lowered in the liquid crystal container so that the boundary of Mixture 2 in the liquid crystal container is aligned at about line 105, shown in FIG. 10. Dry nitrogen gas or other suitable gas or gas mixture is slowly introduced into the container to an approximate pressure level of 2 mmHg. Because of the nitrogen pressure, Mixture 2 is forced through inlet opening 103 into the cell interior to fill the interior of the empty cell.

In order to polymerize the monomer present in the liquid crystal/polymer medium, the monomers were irradiated with UV light with a UV intensity of 20 mW/cm$^2$ at a wavelength of 350 nm at about 50° C. for about 2 minutes, polymerizing the monomer. Then, the inlet opening through which Mixture 2 entered cell unit 100 is sealed off at inlet opening 103.

FIG. 18 is an electron micrograph of the resulting liquid crystal/polymer medium after the liquid crystal has been removed from the medium so that the polymer structure is easily ascertained. As shown in FIG. 18, the polymer has a mesh-like matrix structure. Thus, a liquid crystal/polymer medium composed of liquid crystal dispersed in a polymer matrix is formed.

In this embodiment a color filter is employed in combination with a liquid crystal/polymer medium for use in conjunction with a monochrome display. In this connection, a color filter and liquid crystal/polymer medium having corresponding colors should be employed together. It is important also that different color liquid crystal/polymer mediums are not mixed together.

As shown in FIG. 11, the electrode for IC chip drivers 111, utilized for applying an electric field to the TFT devices, is directly connected to substrate 101 through micro-connection conductor bumps 112. By the same token, counter electrode substrate 101 and its corresponding IC chip drivers 114 are also connected directly to TFT device substrate 100 through micro-connection conductor bumps 112 and silver connecting paste 115. The joints around the cell are then molded with resin to prevent any line breakage due to external pressure or bumping in subsequent handling as well as protect these electrical connections from the affects of the environment. The final step is the mounting the completed liquid crystal panel with its connected IC drivers to a flexible mounting tape that has a plurality of connection leads, similar to that shown at 38 in FIG. 5 of the first embodiment.

A final assembly step is shown in FIG. 12 wherein the mounting of resistance film type, transparent tablet 120 in spaced relation to substrate 90 employing spacer 121, forming air space 122. Thus, tablet 120 functions as a transparent data input device for PDLC panel 100 through air layer 122. The LCD panel 100 is then connected to an IC controller 124 for controlling the operation of drivers 111 and 114.

In the absence of an applied electric field or in the case when an applied voltage is under the threshold voltage of the medium, PDLC panel 100, the entire display device will appear virtually black due to the light absorption by the dichroic dye in the liquid crystal medium and also due to the color filters. When an electric field is applied to all those pixels 92 whose color filter is blue (no field applied to the yellow pixels), the dichroic dye in the liquid crystal/polymer medium aligns itself in the direction of the electric field. This causes light scattering due to the refractive index difference between the polymer and the liquid crystal material. The scattered light as well as the light reflected from the pixel electrodes returning through the crystal/polymer medium and again scattered is transmitted through the blue filters resulting in the entire panel 100 having a light blue appearance. The reason for the light blue appearance, as opposed to a dark blue appearance, is that the scattering of light in the liquid crystal/polymer medium produces a white turbidity of light which is transmitted through the blue filters producing a light blue appearance. Further, applying an electric field to only those pixels 93 whose color filter is yellow, correspondingly, the entire panel 100 has a light yellow appearance.

When an electric field is applied to all blue and yellow pixels 92 and 93 or in the case when a the voltage is above the saturated voltage upon the application, for example, of at least two adjacent blue and yellow pixels 92 and 93 (or all of them), the liquid crystal/polymer medium provides a high level of light scattering providing for high white turbidity so that in the entire panel 100 or the selected color pixel pairs, as the case may be, has a high bright white appearance. If a midpoint voltage midway between the threshold voltage and the saturated voltage is selected with the electric field is applied to all blue and yellow pixels 92 and 93 or, for example, at least two adjacent blue and yellow pixels 92 and 93, then a half tone gray will be achieved. However, if a different level of voltage is selected between the threshold voltage and the saturated voltage, then, depending on the level of voltage selected above or below the midpoint voltage, a selected gray tone can be achieved. If the voltage applied to blue or yellow pixels is different, or the voltage is applied to only either blue pixels or yellow pixels, then, depending on the level of voltage selected above or below the midpoint voltage, a selected color tone can be achieved.

The voltage application-reflectivity characteristic of this device is virtually identical to the contrast curve 82 of FIG. 8. This curve characteristic is devoid of any hysteresis characteristic or intermediate level states and is useful for halftone and animation functions with the display. The response speed of panel 100 is very fast having both a rise and fall speed between OFF and ON states at room temperature of 45 msec.

In order to adjust the color tone of the panel, liquid crystal material having a low birefringence, Δn, value should be used. In this situation, when no electric field is applied to any of the pixels, the absorption of light by the dichroic dye causes the pixels to appear black. When an electric field is applied to only those pixels 92 whose color filter is blue, the entire panel appears dark blue. If an electric field is applied only to those pixels 93 whose color filter is yellow, the entire panel appears dark yellow. If an electric field is applied to both pixels 92 and 93, the panel appears gray. Thus, the lower the birefringence, the darker the color tone and visa versa.

It should be noted that it is not necessary for the reflecting pixel electrodes formed on substrate 101 to have a mirror smooth surface, as is the case for the third embodiment, but rather, the reflecting pixel electrodes may have a bumpy or rough surface.

FIG. 13 illustrates a fourth embodiment of this invention comprising the employment of an active device in the form of a MSI (metal semi-insulator) device 128. MSI device 128 comprises the combination of first transparent conductive film 131 formed on glass substrate 130, a second insulating film 132 formed of $SiN_x$, and a third conductive film 133 formed of Cr. For a counter electrode structure to be employed in combination with device 128, a reflective counter electrode is employed comprising an Al—Mg alloy which are formed into a plurality of parallel strips. These strips can be created in the same manner as explained for the counter electrodes formed for the first embodiment. MSI device substrate 130 and the reflective counter electrode substrate (not shown) were assembled in the same manner as explained in the first embodiment, forming an empty cell with a 5 μm gap. A PDLC apparatus is formed by injecting a liquid crystal/polymer medium of the same type employed in the first embodiment.

A small computer 140 was created by utilizing a panel employing MSI devices 128 and the external appearance of this computer is shown in FIG. 14 comprising PDLC panel 141 having a resistance film, touch panel 142, keyboard 143, and control circuit 144, CPU 145, and front panel light 146.

These devices can be provided with either one unit per pixel or several units per pixel for purposes of redundancy.

Although in this embodiment, the pixel electrode for MSI device is fabricated as a transparent electrode and the counter electrode is fabricated as a reflective electrode, this can be reversed.

Although a touch panel is illustrated as a data input means in this embodiment, an ultrasonic or optical sensor input panels may also be employed. Also, a mouse, an input pen, or a trackball may be employed as data input means. The apparatus can be provided with the function to transfer data to other independent data devices by means of light communication, e.g., infrared light waves, or by FM communication lines, or by fax or cable.

Reference is made to FIG. 15 showing the fifth embodiment of this invention wherein an anti-reflection treatment is provided to a film 156 formed on plate 153, which is secured to the surface of PDLC apparatus 148 to enhance the visibility of displayed information. To begin with, a roughening treatment, e.g., particle blasting or an uneven resin applied coating, is provided on the surface of acrylic plate 153. Then, a silicon coupling agent 154, such as, vunyl triethoxy silane, amono propyl triethoxy silane or vinyl trichoro silane, is applied to acrylic plate 153 to function as adhesion layer. Plate 153 is then baked, a fluorine incorporated resin film 155, approximately 5,000 Å thick, is formed by spin-coating on the surface of agent 154. The fluorine in the resin film provides an anti-reflection quality because of the low refractive index. The resulting structure is again baked. Then, anti-reflection film 156, comprising $MgF_2$, is formed on resin film 155. The physical characteristics of film 156 is designed to approximate the equation, $n \cdot d \approx \lambda/4$, where n is the refractive index of $MgF_2$, d is the thickness of film 156, and λ is the central wavelength of the type of light whose reflection is to be reduced. Acrylic plate 153 is then mounted on the viewing side of PDLC apparatus 148 comprising PDLC medium 150 between substrates 151A and 151B, formed as in the case of the first embodiment. Preferably, a 0.5 mm-thick air gap 152 is provided between acrylic plate 153 and substrate 151B upon assembling the former to the latter apparatus, although plate 153 can be directly attached to substrate 151A. Air gap 152 reduces the reflective glare cause by surface reflection at the surface of substrate 151A, particularly where the reflection electrode of the panel is a highly reflective medium. If the reflective material employed for the reflective pixel electrodes is a roughened reflective surface, which is mentioned later, reflective glare may not be such a problem to require the utilization of an air gap.

In the PDLC apparatus 148, the contrast produced by the PDLC medium remains unchanged, but the mirroring reflection or glare of interfering light on surface 156 is reduced to the viewer resulting in an appearance of displayed letters and characters of being visually enhanced. Also, films of inorganic materials, such as, SiO, $MgF_2$, $SiO_2$, $Al_2O_3$, MgO, $Ta_2O_5$, ZnO, TiO, $CaF$, $AlF_3$, $CeO_2$, Ge, Cu, Au, ZnS, and cryolite, and films of organic materials, e.g., fluorinated polymers, acrylic resin, methacrylic resin, fluorinated coupling agents, Ti-containing coupling agents, and Si-based coupling agents, may be employed and subjected to anti-reflection treatment. The surface of the film may be roughened so as to be irregular. Moreover, various types of treatment can be utilized to improve the adhesion power between the substrate and the anti-reflection treated film.

Although an acrylic plate is employed in this embodiment, appropriately treated films and other thin substrate materials can be secured to the PDLC panel substrate employing either a bonding agent or an adhesive.

In addition to providing anti-reflection treatment on the PDLC apparatus substrate, other methods for enhancing the ease of viewing information on the PDLC panel can be realized. For example, non-glare or anti-glare treatment of the PDLC apparatus substrate can be provided, reflection enhancement means, such as, a thin inorganic film, can be provided on the reflecting pixel electrodes or reflecting counter electrodes, as the case may be, to increase the light scattering effect of the PDLC medium. On the other hand, roughening of the surface of the reflecting electrodes can provide for an increase in the scattering of light reflected and, correspondingly, the light scattering effect of the PDLC medium. Thus, while electrode roughening will decrease the contrast of the LCD panel, the roughening affect enhances a whitish appearance of the reflected light which improves the white turbidity of the display with corresponding decrease in surface glare thereby improving visibility. Also, in the case of TFT active devices, the operating voltage can be increase to enhance the contrast and visibility.

Reference is now made to FIGS. 16A–16C showing the sixth embodiment of this invention involving a double rubbing operation on the alignment films of the pixel electrodes for the purpose of increasing the viewing angle of the PDLC panel, as in the case of the panel made according to the first embodiment. By providing two different rotational directions per pixel, the viewing angle dependency will be averaged over the pixel providing a good viewing of the display from many different angles. While only a double rubbing operation is disclosed in this embodiment, it should be realized that several rubbing directions could be established for a given surface area, such as a pixel electrode area, to enhance the viewing angle from multiple directions.

The double rubbing operation comprises the rubbing of adjacent regions of each pixel electrode in different alignment directions, e.g., opposite alignment directions. For active devices, MIM devices 160 fabricated in accordance with the first embodiment are shown in FIGS. 16. The surface of the MIM device substrate is coated with an orientation film 161 composed of polyimide-based alignment agent 161, Product No. AL-1254, available from Japan Synthetic Rubber Co., Ltd., having an approximate pre-tilt angle of 2°. The coating is applied by spin-coating forming an alignment film having a thickness of about 0.2 μm. The resulting film is then dried for one hour at a temperature of 200° C. Then, a first rubbing operation is conducted in the direction indicated by arrow 162 in FIG. 16A. Subsequently, acrylic-based film 163, which may be about 1 μm thick, is applied to the surface orientation film, which is selectively photoetched in a pattern shown in FIG. 16B so that approximately one-half of the acrylic film is removed from the surface region of each pixel electrode. Then, a second rubbing operation, performed in a direction opposite to the direction of the first rubbing operation, in the direction indicated by arrow 164 in FIG. 16B, is conducted, starting from the location at which the first rubbing operation ended, so that both MIM device substrate and facing substrate were rubbed. After this second rubbing operation, acrylic film 163 is then removed from the surface of alignment film 161 employing an acrylic solvent. The liquid crystal/polymer medium in the panel according to the first embodiment wherein the polymer precursor is polymerized, containing two separate rubbing regions per pixel, polymer helicoids 51 having separate axes were formed per pixel electrode with their respective axes oriented in opposite helical directions. Also, embodiment 6 has been applied to TN-TFT LCD panels.

While the invention has been described in conjunction with several specific embodiments, it is evident to those skilled in the art that many further alternatives, modifications and variations is apparent in light of the forgoing description. Thus, the invention described herein is intended to embrace all such alternatives, modifications, applications and variations as may fall within the spirit and scope of the appended claims.

What is claimed is:

1. A polymer dispersed liquid crystal apparatus having a liquid crystal/polymer medium formed between spatially disposed electrodes, comprising a polymer phase and a liquid crystal phase formed in said medium as said polymer dispersed in said liquid crystal, said polymer phase and said liquid crystal phase having optical axes substantially alignable together in a predetermined direction, a light absorption additive included in said liquid crystal phase to provide light absorption when said optical axes are substantially aligned in said predetermined direction, and means for applying an electric field between said electrodes to switch between multiple states comprising alignment and misalignment of said optical axes of said liquid crystal phase relative to said polymer phase so that in a condition of absence of said electric field, a light absorption state is created in said medium and in another condition of presence of said electric field, a light scattering state is created in said medium.

2. The polymer dispersed liquid crystal apparatus of claim 1 wherein the degree of light scattering on the liquid crystal/polymer medium is greater in the case when an electric field is applied than in the case when an electric field is not applied.

3. The polymer dispersed liquid crystal apparatus of claim 2 further comprising a reflecting component positioned next to said liquid crystal/polymer medium on a side thereof opposite to a side wherein incident light enters said medium, a portion of said incident light, not scattered by said medium, is transmitted through said medium and reflected by said reflecting component for reentry into said medium where it is further scattered.

4. The polymer dispersed liquid crystal apparatus of claim 1 wherein the light absorption quality by said liquid crystal/polymer medium is smaller in the case when an electric field is applied than in the case when an electric field is not applied.

5. The polymer dispersed liquid crystal apparatus of claim 4 further comprising a reflecting component positioned next to said liquid crystal/polymer medium on a side thereof opposite to a side wherein incident light enters said medium, a portion of said incident light, not absorbed by said medium, is transmitted through said medium and reflected by said reflecting component for reentry into said medium where it is further absorbed.

6. The polymer dispersed liquid crystal apparatus of claim 1 wherein a light reflecting surface is provided adjacent to said liquid crystal/polymer medium.

7. The polymer dispersed liquid crystal apparatus of claim 6 wherein level of reflectivity of said light reflecting surface is smaller in the case when an electric field is applied than in the case when an electric field is not applied.

8. The polymer dispersed liquid crystal apparatus of claim 6 wherein said liquid crystal/polymer medium is in contact with said reflective light reflecting surface.

9. The polymer dispersed liquid crystal apparatus of claim 6 wherein said liquid crystal/polymer medium is in contact with one surface of two surfaces of a transparent layer with the other surface having said reflective light reflecting surface.

10. The polymer dispersed liquid crystal apparatus of claim 9 wherein said transparent layer is an insulating material.

11. The polymer dispersed liquid crystal apparatus of claim 10 wherein said transparent layer is a passivation film or an alignment film.

12. The polymer dispersed liquid crystal apparatus of claim 9 wherein said transparent layer is a conductive material.

13. The polymer dispersed liquid crystal apparatus of claim 12 wherein said transparent layer is an ITO layer.

14. The polymer dispersed liquid crystal apparatus of claim 6 wherein said light reflecting surface comprises at least one layer of a metal or metal oxide.

15. The polymer dispersed liquid crystal apparatus of claim 14 wherein said light reflecting surface comprise at least one layer selected from the group consisting of Al, Cr, Ag, Ni, Al—Mg alloy, or Al alloy.

16. The polymer dispersed liquid crystal apparatus of claim 1 wherein said light absorption state is created in said medium when an electric field is not applied and said light scattering state is created in said medium when an electric field is applied.

17. The polymer dispersed liquid crystal apparatus of claim 1 wherein said liquid crystal/polymer medium displays bright information against a dark background.

18. The polymer dispersed liquid crystal apparatus of claim 1 wherein said liquid crystal/polymer medium displays dark information against a bright background.

19. The polymer dispersed liquid crystal apparatus of claim 1 wherein said polymer phase comprises a network including a plurality of continuous strings of particles connected in helicoid formation.

20. The polymer dispersed liquid crystal apparatus of claim 1 wherein said polymer phase comprises a network including a gel matrix of polymer particles.

21. The polymer dispersed liquid crystal apparatus of claim 1 wherein the electric field applied to said medium is accomplished via an active device.

22. The polymer dispersed liquid crystal apparatus of claim 21 wherein said active device is a MIM device.

23. The polymer dispersed liquid crystal apparatus of claim 21 wherein said active device is a TFT device.

24. The polymer dispersed liquid crystal apparatus of claim 21 wherein said active device is MSI device.

25. The polymer dispersed liquid crystal apparatus of claim 21 wherein said spatially disposed electrodes comprise a pixel electrode connected via said active device and a counter electrode for applying an electric field therebetween to optically disalign said polymer phase and said liquid crystal phase optical axes scattering substantially all light incident on said liquid crystal/polymer medium.

26. The polymer dispersed liquid crystal apparatus of claim 1 wherein a reflecting component is positioned next to said liquid crystal/polymer medium on a side thereof opposite to a side wherein incident light enters said medium, the optical axis of said polymer phase oriented substantially in a direction from which incident light entering said liquid crystal/polymer medium is reflected back through said medium.

27. The polymer dispersed liquid crystal apparatus of claim 1 wherein means is applied to said apparatus to reduce reflection glare.

28. The polymer dispersed liquid crystal apparatus of claim 27 wherein said means is provided on a side of said liquid crystal/polymer medium wherein incident light enters said medium.

29. The polymer dispersed liquid crystal apparatus of claim 27 wherein a reflecting component is positioned next to said liquid crystal/polymer medium on a side thereof opposite to a side wherein incident light enters said medium, said means is provided between said reflecting component and said liquid crystal/polymer medium.

30. The polymer dispersed liquid crystal apparatus of claim 27 wherein said means comprises a treated film.

31. The polymer dispersed liquid crystal apparatus of claim 1 wherein said spatially disposed electrodes are formed on respective substrates between which said liquid crystal/polymer medium is supported, a layer provided between said substrates, said layer having a diffraction index different from a diffraction index of at least one of said substrates affective for reducing reflection glare.

32. The polymer dispersed liquid crystal apparatus of claim 1 wherein said spatially disposed electrodes are formed on respective substrates between which said liquid crystal/polymer medium is supported, at least one of said substrates including a film having a fluorine-containing compound affective for reducing reflection glare.

33. The polymer dispersed liquid crystal apparatus of claim 1 further comprising illumination means for projecting light onto said apparatus.

34. The polymer dispersed liquid crystal apparatus of claim 1 wherein said spatially disposed electrodes are formed on respective substrates between which said liquid crystal/polymer medium is supported, said substrates comprising a polymer material.

35. The polymer dispersed liquid crystal apparatus of claim 34 wherein said polymer material is flexible.

36. The polymer dispersed liquid crystal apparatus of claim 1 wherein said spatially disposed electrodes are formed on respective substrates between which said liquid crystal/polymer medium is supported, said substrates comprising a material selected from the group consisting of glass, metal, metal oxide and semiconductor compound.

37. The polymer dispersed liquid crystal apparatus of claim 1 wherein said spatially disposed electrodes form a plurality of pixels, said liquid crystal/polymer medium comprising a mixture of a liquid crystal material, light absorbing material, and at least one polymer, said mixture permitting said pixels to display a different color tone.

38. The polymer dispersed liquid crystal apparatus of claim 37 wherein said pixels include individual encapsulated cells of liquid crystal/polymer medium containing said light absorbing material, at least some of said of said encapsulated light absorbing material cells being of different color tone from others of said encapsulated light absorbing material cells.

39. The polymer dispersed liquid crystal apparatus of claim 37 wherein said light absorbing material is transmissive to UV light of a predetermined wavelength.

40. The polymer dispersed liquid crystal apparatus of claim 37 wherein color tone provided by said light absorbing material and color tone provided by said liquid crystal/polymer medium are of complement colors.

41. The polymer dispersed liquid crystal apparatus of claim 37 wherein more than one light absorbing material is provided in said mixture, color tones provided by said liquid crystal/polymer medium are of complement colors.

42. The polymer dispersed liquid crystal apparatus of claim 1 wherein said spatially disposed electrodes form a plurality of pixels, at least some of said pixels provided with a light absorbing means of a different color tone from others of said pixels to provide different displayed colors.

43. The polymer dispersed liquid crystal apparatus of claim 1 wherein said spatially disposed electrodes form a plurality of pixels, at least some of said pixels provided with a combination light reflecting means and a light absorbing material of a different color tone from others of said pixels to provide different displayed colors.

44. The polymer dispersed liquid crystal apparatus of claim 43 wherein said light absorption material is provided relative to one major surface of said liquid crystal/polymer medium and said light reflecting means is provided relative to the other major surface of said liquid crystal/polymer medium.

45. The polymer dispersed liquid crystal apparatus of claim 44 wherein said one major surface is on a side of said medium wherein incident light enters said medium.

46. The polymer dispersed liquid crystal apparatus of claim 1 wherein said liquid crystal/polymer medium comprises at least one liquid crystal component that contains a halogen atom.

47. The polymer dispersed liquid crystal apparatus of claim 1 wherein said liquid crystal/polymer medium contains at least one liquid crystal compound selected from the group consisting of

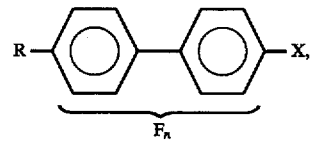

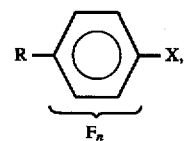

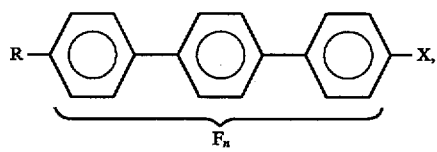

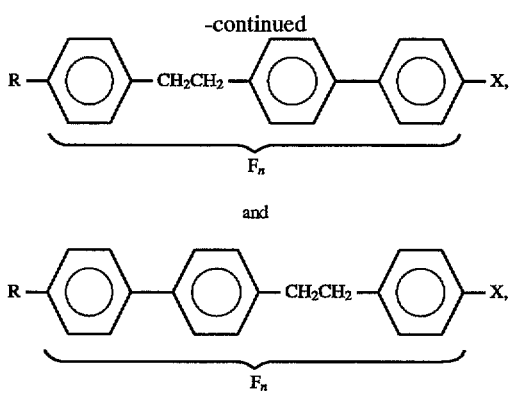

wherein "n" is an integer; "R" is an alkyl group, a cycloalkyl group or an alkoxy group; and "X" is H, F, Cl or CN.

48. The polymer dispersed liquid crystal apparatus of claim 1 wherein said light absorption additive is selected from the group consisting of anthraquinone derivatives, perylene derivatives, and quinophthalone derivatives.

49. The polymer dispersed liquid crystal apparatus of claim 1 wherein said polymer in said medium comprises at least a biphenyldimethacrylate derivative or biphenylacrylate derivative.

50. The polymer dispersed liquid crystal apparatus of claim 1 wherein said polymer contains at least one of one of groups consisting of a phenyl group, biphenyl group, terphenyl group, quaterphenyl group, or tolane group.

51. The polymer dispersed liquid crystal apparatus of claim 1 further comprising controller means to provide information signals to said apparatus for visual display of information represented by said signals.

52. An information processing apparatus comprising:

a polymer dispersed in liquid crystal display device having a liquid crystal/polymer medium formed between spatially disposed electrodes, said apparatus having a controller for receiving data for processing and displaying information based upon the data via addressing means applied to said liquid crystal/polymer medium, said liquid crystal/polymer medium comprising a polymer phase dispersed in a liquid crystal phase, said polymer phase and said liquid crystal phase having optical axes substantially alignable in a predetermined direction, a light absorption additive included in the liquid crystal phase to provide for light absorption when said optical axes are substantially aligned in the said predetermined direction, and means for applying a field between said electrodes to switch between multiple states comprising alignment and misalignment of said optical axes of said liquid crystal phase relative to said polymer phase so that, in a condition of absence of said field, a light absorption state is created in said medium and, in another condition of presence of said field, a light scattering state is created in said medium.

53. An information processing apparatus comprising:

a polymer dispersed in liquid crystal display device having a liquid crystal/polymer medium, a controller for receiving data for processing and displaying information based upon the data via addressing means applied to said liquid crystal/polymer medium formed between spatially disposed substrates each having a surface with a set of electrodes, integrated circuit means to address said electrode sets, the set of electrodes formed on one of said substrates including a plurality of pixel electrodes each connected to an active device, said liquid crystal/polymer medium comprising a polymer phase dispersed in a liquid crystal phase, said polymer phase and said liquid crystal phase having optical axes substantially alignable in a predetermined direction, a light absorption additive included in the liquid crystal phase to provide for light absorption when said optical axes are substantially aligned in the said predetermined direction, and means for applying a field between said electrode sets to switch, via said active devices, between multiple states comprising alignment and misalignment of said optical axes of said liquid crystal phase relative to said polymer phase so that, in a condition of absence of said field, a light absorption state is created in said medium and, in another condition of presence of said field, a light scattering state is created in said medium.

54. The information processing apparatus of claim 53 wherein said active devices are a MIM device, TFT device or a MSI device.

55. The information processing apparatus of claim 53 wherein said pixel electrodes and said active devices are integrally formed together on said one substrate, said pixel electrodes comprising a light reflecting surface.

56. The information processing apparatus of claim 53 further said integrated circuit means further comprises integrated circuit drivers for driving said active devices, said active devices and said integrated circuit drivers formed on one of said substrates.

57. The information processing apparatus of claim 56 further comprising means to electrically connect said active devices and said integrated circuit drivers on said one substrate to electrical means formed on the other of said substrates for connection to an external circuit.

58. The information processing apparatus of claim 56 wherein said active devices and said integrated circuit drivers on said one substrate are environmentally protected through encapsulation with insulating material.

59. An information processing apparatus comprising:

a polymer dispersed in liquid crystal display device having a liquid crystal/polymer medium, a controller for receiving data for processing and displaying information based upon the data via addressing means applied to said liquid crystal/polymer medium formed between spatially disposed substrates each having a surface with a set of electrodes, integrated circuit means to address said electrode sets, the set of electrodes formed on one of said substrates including a plurality of pixel electrodes each connected to a bi-terminal active device, the set of said electrodes formed on the other of said substrates comprising aligned counter electrodes, said liquid crystal/polymer medium comprising a polymer phase dispersed in a liquid crystal phase, said polymer phase and said liquid crystal phase having optical axes substantially alignable in a predetermined direction, a light absorption additive included in the liquid crystal phase to provide for light absorption when said optical axes are substantially aligned in the said predetermined direction, and means for applying a field between said pixel electrodes and said counter electrodes to switch between multiple states comprising alignment and misalignment of said optical axes of said liquid crystal phase relative to said polymer phase so that, in a condition of absence of said field, a light absorption state is created in said medium and, in another condition of presence of said field, a light scattering state is created in said medium, said switching between states accomplished by application of a voltage inverse to the voltage-current characteristic for bi-terminal active devices.

60. An information processing apparatus comprising:

a polymer dispersed in liquid crystal display device having a liquid crystal/polymer medium, a controller for receiving data for processing and displaying information based upon the data via addressing means applied to said liquid crystal/polymer medium formed between spatially disposed substrates each having a surface with a set of electrodes, an array of microlenses on a surface of one of said substrates, a light reflecting surface on a surface of the other of said substrates, said liquid crystal/polymer medium comprising a polymer phase dispersed in a liquid crystal phase, said polymer phase and said liquid crystal phase having optical axes substantially alignable in a predetermined direction, a light absorption additive included in the liquid crystal phase to provide for light absorption when said optical axes are substantially aligned in the said predetermined direction, and means for applying a field between said spatially disposed electrode sets to switch between multiple states comprising alignment and misalignment of said optical axes of said liquid crystal phase relative to said polymer phase so that, in a condition of absence of said field, a light absorption state is created in said medium and, in another condition of presence of said field, a light scattering state is created in said medium.

61. An information processing apparatus comprising:

a polymer dispersed in liquid crystal display device having a liquid crystal/polymer medium formed between surfaces of spatially disposed substrates, alignment means provided on at least one of the surfaces of said substrates in contact with said medium, the polymer in said medium formed by polymerization of at least one monomer after said medium has been subjected to substantial predetermined alignment brought about by said alignment means, a controller for receiving data for processing and displaying information based upon the data via addressing means applied to said liquid crystal/polymer medium formed between spatially disposed substrates each having a surface with a set of electrodes, the set of electrodes formed on one of said substrates including a plurality of pixel electrodes, said liquid crystal/polymer medium comprising a polymer phase dispersed in a liquid crystal phase, said polymer phase and said liquid crystal phase having optical axes substantially alignable in a predetermined direction, a light absorption additive included in the liquid crystal phase to provide for light absorption when said optical axes are substantially aligned in the said predetermined direction, and means for applying a field between said spatially disposed electrode sets to switch between multiple states comprising alignment and misalignment of said optical axes of said liquid crystal phase relative to said polymer phase so that, in a condition of absence of said field, a light absorption state is created in said medium and, in another condition of presence of said field, a light scattering state is created in said medium.

62. The information processing apparatus of claim 61 wherein said alignment means is an alignment film, a single alignment direction formed on said alignment film relative to each of said pixel electrodes.

63. The information processing apparatus of claim 61 wherein said alignment means is an alignment film, at least two different alignment directions formed on said alignment film relative to each of said pixel electrodes.

64. The information processing apparatus of claim 63 wherein said different alignment directions are formed in opposite directions.

65. A polymer dispersed liquid crystal display apparatus comprising:

a liquid crystal/polymer medium formed between spatially disposed substrates each having a surface with a set of electrodes, a polymer phase and a liquid crystal phase formed in said medium as said polymer dispersed in said liquid crystal, said polymer phase and said liquid crystal phase having optical axes substantially alignable together in a predetermined direction, a light absorption additive included in said liquid crystal phase to provide light absorption when said optical axes are substantially aligned in said predetermined direction, means for applying an electric field between said electrodes to switch between multiple states comprising alignment and misalignment of said optical axes of said liquid crystal phase relative to said polymer phase so that in a condition of absence of said electric field, a light absorption state is created in said medium and in another condition of presence of said electric field, a light scattering state is created in said medium, and enhancing means applied to said apparatus for improving the clarity of viewing of said display apparatus.

66. The polymer dispersed liquid crystal display apparatus of claim 65 wherein said enhancing means comprises anti-reflection glare layer formed adjacent to one of said substrates.

67. The polymer dispersed liquid crystal display apparatus of claim 65 wherein said enhancing means comprises a light absorption layer formed adjacent to one of said substrates.

68. A polymer dispersed liquid crystal apparatus comprising:

a liquid crystal/polymer medium formed between spatially disposed electrodes each having a surface with a set of electrodes, a polymer phase and a liquid crystal phase formed in said medium, said polymer phase and said liquid crystal phase having optical axes substantially alignable together in a predetermined direction, means for applying an electric field between said electrodes to switch between multiple states comprising alignment and misalignment of said optical axes of said liquid crystal phase relative to said polymer phase so that in one condition, a light absorption state is created in said medium and in the other condition, a light scattering state is created in said medium, wherein said polymer phase comprises a network comprising a plurality of helicoids of coupled polymer particles extending between said substrates.

69. The polymer dispersed liquid crystal apparatus of claim 68 wherein the amount of light scattering in said light scattering state is greater in the case where said electric field is applied as compared to a case where said electric field is not applied.

70. The polymer dispersed liquid crystal apparatus of claim 68 further comprising a light reflecting surface provided adjacent to one major surface of said liquid crystal/polymer medium, at least a portion of incident light entering said medium from another major surface of said liquid crystal/polymer medium, opposite to said one major surface, reflected by said light reflecting surface back into said medium.

71. The polymer dispersed liquid crystal apparatus of claim 70 wherein the amount of reflected light from said light reflecting surface back into said medium is smaller in the case where said electric field is applied as compared to a case where said electric field is not applied.

72. The polymer dispersed liquid crystal apparatus of claim 68 wherein said polymer phase further comprises separate polymer particles, which together with other associated polymer particles form a gel network.

73. The polymer dispersed liquid crystal apparatus of claim 68 wherein said liquid crystal/polymer medium contains at least one liquid crystal compound selected from the group consisting of

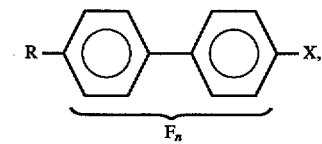

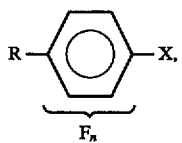

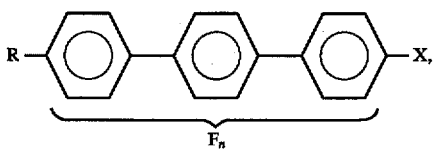

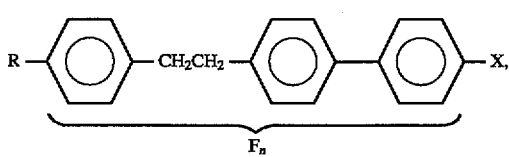

and

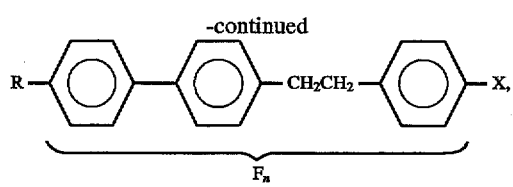

wherein "n" is an integer; "R" is an alkyl group, a cycloalkyl group or an alkoxy group; and "X" is H, F, Cl or CN.

74. The polymer dispersed liquid crystal apparatus of claim 68 wherein said means for applying an electric field includes a plurality of active devices formed on one of said substrates.

75. The polymer dispersed liquid crystal apparatus of claim 68 at least one of the sets of electrodes includes a plurality of pixel electrodes each connected to an active device, wherein selected of said pixel electrodes are provided with a light filtering layer having a different color tone compared to other of said pixel electrodes.

76. The polymer dispersed liquid crystal apparatus of claim 68 wherein said liquid crystal/polymer medium contains at least one liquid crystal component containing a halogen atom.

77. A method of fabricating a polymer dispersed liquid crystal display apparatus including the formation of a liquid crystal/polymer medium having a polymer network between two surfaces of spatially disposed substrates, comprising the steps of:

forming a layer comprising a light absorption material on at least one of said substrate surfaces, applying a liquid crystal/polymer medium onto the light-absorbing layer, and dissolving the light absorption material into the liquid crystal/polymer medium, wherein said polymer network comprises a plurality of helicoids of coupled polymer particles extending between said substrates.

78. The method of fabricating a polymer dispersed liquid crystal display apparatus of claim 77 further comprising the steps of forming regions of said medium disposed between the substrate surfaces into a plurality of pixels, and forming a barrier to the flow of the liquid crystal/polymer medium between adjacently formed pixels to create different color tones relative to different pixels.

79. A method of fabricating a polymer dispersed liquid crystal display apparatus including the formation of a liquid crystal/polymer medium having a polymer network between two surfaces of spatially disposed substrates, comprising the steps of:

forming a set of electrodes on the respective surfaces of said substrates, incorporating a light absorption additive in the liquid crystal/polymer medium capable of displaying at least two different color tones, forming a plurality of color filters relative to a surface of one of the substrates comprising at least two different color tones, controlling said electrodes so that respective cross points will display black, white, or one of said color tones.

80. The method of fabricating a polymer dispersed liquid crystal display apparatus of claim 79 wherein the color tones of light absorption additive and the color filters are complementary.

81. The method of fabricating a polymer dispersed liquid crystal display apparatus of claim 79 wherein the step of controlling comprises the steps of:

applying no electrical field to a plurality of cross point pixels will display black, applying an electrical field to all of a plurality of cross point pixels will display white, and applying an electrical field to selected of a plurality of cross point pixels will display a color of one of said color tones.

82. An information processing apparatus comprising a polymer dispersed liquid crystal display device having a liquid crystal/polymer medium, a controller for receiving data for processing and displaying information based upon the data via addressing means applied to said liquid crystal/polymer medium formed between spatially disposed substrates each having a surface with a set of electrodes, the spatial crossing points of said spatially disposed electrode sets forming display pixels, said liquid crystal/polymer medium comprising a polymer phase and a liquid crystal phase, said polymer phase and said liquid crystal phase having optical axes substantially alignable in a predetermined direction, a light absorption additive included in the liquid crystal phase to provide for light absorption when said optical axes are substantially aligned in the said predetermined direction, means for applying a field between said electrodes to switch between multiple states comprising alignment and misalignment of said optical axes of said liquid crystal phase relative to said polymer phase so that, in one condition, a light absorption state is created in said medium and, in another condition, a light scattering state is created in said medium, and means for driving said liquid crystal/polymer medium wherein each pixel has a different color tone so that in the case of an applied voltage greater than a saturation voltage to which said medium is responsive will display white, in the case of an applied voltage less than a threshold voltage said medium is responsive will display black, and in the case of an applied voltage between the saturation voltage and the threshold voltage said medium will display at least one color.

83. A polymer dispersed liquid crystal apparatus comprising:

a liquid crystal/polymer medium formed between spatially disposed electrodes each having a surface with a set of electrodes, a polymer phase dispersed in a liquid crystal phase formed in said medium, said polymer phase and said liquid crystal phase having optical axes substantially alignable together in a predetermined direction, means for applying an electric field between said electrodes to switch between multiple states comprising alignment and misalignment of said optical axes of said liquid crystal phase relative to said polymer phase so that in a condition of absence of said electric field, a light absorption state is created in said medium and in another condition of presence of said electric field, a light scattering state is created in said medium, wherein said polymer phase has a mesh-like matrix structure.

84. A method of fabricating a polymer dispersed liquid crystal display apparatus including the formation of a liquid crystal/polymer medium having a polymer network between two surfaces of spatially disposed substrates, comprising the steps of:

forming a layer comprising a light absorption material on at least one of said substrate surfaces, applying a liquid crystal/polymer medium comprising polymer dispersed in liquid crystal onto the light-absorbing layer, wherein said polymer and said liquid crystal have optical axes substantially alignable together in a predetermined direction, and dissolving the light absorption material into the liquid crystal/polymer medium, wherein said polymer phase has a mesh-like matrix structure.

85. The information processing apparatus of claim 53, further comprising data input means to receive the data and transmit the data to said controller.

86. The information processing apparatus of claim 85, wherein said data input means is selected from the group consisting of a keyboard, a touch panel, an input pen, and a trackball.

* * * * *